US009836361B2

(12) United States Patent
Arai

(10) Patent No.: US 9,836,361 B2
(45) Date of Patent: Dec. 5, 2017

(54) DATA REPLICATING SYSTEM, DATA REPLICATING METHOD, NODE DEVICE, MANAGEMENT DEVICE AND COMPUTER READABLE MEDIUM

(71) Applicant: NEC CORPORATION, Tokyo (JP)

(72) Inventor: Ichiro Arai, Tokyo (JP)

(73) Assignee: NEC Corporation, Tokyo (JP)

( * ) Notice: Subject to any disclaimer, the term of this patent is extended or adjusted under 35 U.S.C. 154(b) by 87 days.

(21) Appl. No.: 14/776,314

(22) PCT Filed: Dec. 16, 2013

(86) PCT No.: PCT/JP2013/007367
§ 371 (c)(1),
(2) Date: Sep. 14, 2015

(87) PCT Pub. No.: WO2014/141343
PCT Pub. Date: Sep. 18, 2014

(65) Prior Publication Data
US 2016/0041885 A1 Feb. 11, 2016

(30) Foreign Application Priority Data
Mar. 13, 2013 (JP) .................................. 2013-050236

(51) Int. Cl.
*G06F 11/00* (2006.01)
*G06F 11/14* (2006.01)
*G06F 17/30* (2006.01)

(52) U.S. Cl.
CPC ...... *G06F 11/1469* (2013.01); *G06F 11/1451* (2013.01); *G06F 11/1471* (2013.01);
(Continued)

(58) Field of Classification Search
CPC ............. G06F 11/1469; G06F 11/1451; G06F 11/1471; G06F 11/0709; G06F 11/0727;
(Continued)

(56) References Cited

U.S. PATENT DOCUMENTS 7,739,233 B1 * 6/2010 Ghemawat ........ G06F 17/30215
707/610
8,074,107 B2 * 12/2011 Sivasubramanian G06F 11/2025
714/11

(Continued)

FOREIGN PATENT DOCUMENTS

EP        902370 A2      3/1999
EP        1843249 A2    10/2007
(Continued)

OTHER PUBLICATIONS

International Search Report, Corresponding to PCT/JP2013/007367, dated Jan. 28, 2014, 2 pp.

*Primary Examiner* — Joseph D Manoskey
(74) *Attorney, Agent, or Firm* — Wilmer Cutler Pickering Hale and Dorr LLP

(57) ABSTRACT

Each node constituting this data replicating system returns a response to a data operation requesting device upon having written, into a temporary storage device of the node itself, a post-update log of a data record for which an operation requested by a data operation request was executed. Furthermore, when a checkpoint is reached, each node updates a data record storage unit of the node itself on the basis of the post-update log of the data record stored in the temporary storage device of the node itself, writes the post-update log of the data record stored in the temporary storage device of the node itself into an update history storage unit of the node itself, and writes, into a shared storage device shared with other nodes, checkpoint information having information for specifying a latest post-update log written into the update history storage unit.

19 Claims, 13 Drawing Sheets

(52) U.S. Cl.
CPC .. *G06F 17/30368* (2013.01); *G06F 17/30575* (2013.01); *G06F 2201/80* (2013.01); *G06F 2201/84* (2013.01)

(58) Field of Classification Search
CPC ......... G06F 17/30368; G06F 17/30575; G06F 2201/80; G06F 2201/84
USPC .......................... 714/18, 4.1, 4.3, 20, 42, 43
See application file for complete search history.

(56) References Cited

U.S. PATENT DOCUMENTS

| | | | |
|---|---|---|---|
| 8,850,144 B1* | 9/2014 | Natanzon | G06F 11/0712 |
| | | | 711/162 |
| 8,856,593 B2* | 10/2014 | Eckhardt | G06F 11/2028 |
| | | | 709/217 |
| 2001/0029570 A1 | 10/2001 | Yamamoto et al. | |
| 2002/0129202 A1 | 9/2002 | Yamamoto et al. | |
| 2004/0068628 A1 | 4/2004 | Suzuki et al. | |
| 2004/0088484 A1 | 5/2004 | Yamamoto et al. | |
| 2004/0199737 A1 | 10/2004 | Yamamoto et al. | |
| 2005/0120092 A1 | 6/2005 | Nakano et al. | |
| 2007/0038833 A1 | 2/2007 | Yamamoto et al. | |

FOREIGN PATENT DOCUMENTS

| | | |
|---|---|---|
| JP | 3-12773 A | 1/1991 |
| JP | 4-291618 A | 10/1992 |
| JP | 11-85408 A | 3/1999 |
| JP | 2010-501942 A | 1/2010 |
| JP | 5050358 B2 | 10/2012 |
| JP | 2012-234509 A | 11/2012 |

* cited by examiner

DATA REPLICATING SYSTEM, DATA REPLICATING METHOD, NODE DEVICE, MANAGEMENT DEVICE AND COMPUTER READABLE MEDIUM

CROSS-REFERENCE TO RELATED APPLICATIONS

The present application is a national stage application of International Application No. PCT/JP2013/007367 entitled "Data Multiplexing System," filed on Dec. 16, 2013,which claims the benefit of priority from Japanese Patent Application No. JP2013-050236, filed on Mar. 13, 2013, the disclosures of which are incorporated herein in their entirety by reference thereto.

TECHNICAL FIELD

The present invention relates to a data replicating system, a data replicating method, a node device, a management device, and a program.

BACKGROUND ART

A data replicating system which replicates data in case of loss of data accumulated in a database is proposed and in practical use.

For example, it is proposed as a first related technology of the present invention that an application server replicates a data operation request and transmits the same data operation request to a plurality of nodes, each of the nodes processes the same data operation request, so that the data accumulated in the plurality of nodes is equalized (refer to, for example, Patent Literature PTL 1). It is also proposed as a second related technology of the present invention, the target of which is KVS (Key-Value Store) to store replicated same data in the plurality of nodes (refer to, for example, Patent Literature PTL 2).

As a method of reducing a frequency of access to a permanent storage device, which is involved by processing a data operation request, there is an antecedent log writing technique called WAL (Write Ahead Logging). In WAL, the completion of writing a post-update log of a data record is considered to be the completion (commitment) of processing the data operation request, and the actual updating the data record is performed on the basis of the post-update log at the time of subsequent checkpoint. For example, it is proposed as a third related technology of the present invention to adopt WAL for a transaction processing, to write a post-update log to the permanent storage device at the time of commitment of the transaction, and to write actual data to a database at the time of checkpoint (refer to, for example, patent literature 3).

CITATION LIST

Patent Literature

[PTL 1] Japanese Patent No. 5050358
[PTL 2] Japanese Unexamined Patent Application Publication (Translation of PCT Application) Laid-Open No. 2010-501942
[PTL 3] Japanese Patent Application Publication No. 2012-234509

SUMMARY OF INVENTION

Technical Problem

In order to improve a processing efficiency of the data replicating system as described in the first or second related technology, WAL technique as described in the third related technology may be applied to each node of the data replicating system. However, as found in the third related technology, in WAL technique of writing the post-update log of the data record to the permanent storage device as described in the third related technology, processing of writing the post-update log to the permanent storage device is an overhead. This overhead is able to be reduced by writing the post-update log to a temporary storage device whose access speed is faster than that of the permanent storage device. However, when the post-update log is written in the temporary storage device, the post-update log in the temporary storage device is lost if a node fails. For this reason, the actual data is not able to be updated on the basis of the post-update log in the failed node. In a node which is not failed, the actual data is updated on the basis of the post-update log. Accordingly, inconsistency occurs in the data held by the plurality of nodes in the data replicating system. One of methods of correcting such inconsistency of data is obtaining the post-update log lost from the failed node from another node which does not fail, and performing failure recovery processing in the failed node by using the obtained post-update log. However, it is difficult to identify quickly in another node the post-update log that is the same as the post-update log lost from the failed node.

An object of the present invention is to provide a data replicating system which is able to solve the above-mentioned problem that it is difficult to identify quickly in another node the post-update log that is the same as the post-update log lost from the failed node.

Solution to Problem

A data replicating system according to a first aspect of the present invention including a plurality of nodes, the plurality of nodes receiving a data operation request from a data operation requesting device which replicates a data operation request and transmits the same data operation requests to the plurality of nodes, includes:

a shared storage device that is accessible from the plurality of nodes, wherein each of the nodes includes: a processing device; a permanent storage device; and a temporary storage device, the permanent storage device includes: a data record storage unit that stores a data record; and an update history storage unit that stores a post-update log of the data record, and the processing device includes:

data operation means for transmitting a response to the data operation requesting device when writing, to the temporary storage device of an own node, the post-update log of the data record on executing an operation requested by the data operation request; and checkpoint processing means for, when a checkpoint time comes, updating the data record storage unit of the own node on a basis of the post-update log of the data record stored in the temporary storage device of the own node, writing the post-update log of the data record stored in the temporary storage device of the own node to the update history storage unit of the own node, and writing, to the shared storage device, checkpoint information including information identifying a latest post-update log written to the update history storage unit.

A data replicating method according to a second aspect of the present invention in a data replicating system including: a plurality of nodes; and a temporary storage device, the plurality of nodes each including: a processing device; a permanent storage device; and a temporary storage device, the shared storage device being accessible from a plurality of the nodes, the plurality of nodes receiving a data operation request from a data operation requesting device which replicates the data operation request and transmits same data operation request to the plurality of nodes, the permanent storage device including: a data record storage unit that stores a data record; and an update history storage unit that stores a post-update log of the data record, includes:

when writing, to the temporary storage device of an own node, the post-update log of the data record on executing an operation requested by the data operation request, by the processing device of each of the nodes, returning a response to the data operation requesting device, and when a checkpoint time comes, by the processing device of each of the nodes, updating the data record storage unit of the own node on a basis of the post-update log of the data record stored in the temporary storage device of the own node, writing, to the update history storage unit of the own node, the post-update log of the data record stored in the temporary storage device of the own node, and writing, to the shared storage device, checkpoint information including information identifying a latest post-update log written to the update history storage unit.

A node device according to a third aspect of the present invention connected with a data operation requesting device replicating a data operation request and transmitting the data operation request and a shared storage device shared with another node device, includes:

a processing device; a permanent storage device; and a temporary storage device, wherein the permanent storage device includes: a data record storage unit that stores a data record; and an update history storage unit that stores a post-update log of the data record, and the processing device includes:

data operation means for transmitting a response to the data operation requesting device when writing, to the temporary storage device of an own node, the post-update log of the data record on executing an operation requested by the data operation request; and checkpoint processing means for, when a checkpoint time comes, updating the data record storage unit of the own node on a basis of the post-update log of the data record stored in the temporary storage device of the own node, writing, to the update history storage unit of the own node, the post-update log of the data record stored in the temporary storage device of the own node, and writing, to the shared storage device, checkpoint information including information identifying a latest post-update log written to the update history storage unit.

A management device according to a fourth aspect of the present invention in a data replicating system including: a shared storage device including a plurality of nodes; and a shared storage device accessible from the plurality of nodes, the management device connected to the plurality of nodes and the shared storage device, the plurality of nodes each including: a processing device; a permanent storage device; and a temporary storage device, the plurality of nodes each receiving a data operation request from a data operation requesting device replicating the data operation request and transmitting the same data operation request to the plurality of nodes, the permanent storage device including: a data record storage unit that stores a data record; and an update history storage unit that stores a post-update log of the data record, the processing device including: data operation means for transmitting a response to the data operation requesting device when writing the post-update log of the data record on execution of the operation requested by the data operation request to the temporary storage device of a own node; and checkpoint processing means for, when a checkpoint time comes, updating the data record storage unit of the own node on a basis of the post-update log of the data record stored in the temporary storage device of the own node, writing the post-update log of the data record stored in the temporary storage device of the own node to the update history storage unit of the own node, and writing checkpoint information including information identifying a latest post-update log written to the update history storage unit in the shared storage device, includes:

other-node-failure recovery means for reading out, from the shared storage device, the checkpoint information written by the node which is failed, estimating the post-update log having possibility of being lost from the temporary storage device of the node which is failed on a basis of the checkpoint information which is read out, reading out the post-update log that is same as the estimated post-update log from the update history storage unit or the temporary storage device of the node other than the node which is failed, and transmitting the post-update log which is read out as a post-update log for failure recovery to the node which is failed.

A program according to a fifth aspect of the present invention for a computer with which a processing device of a node device is configured, the node device connected with a data operation requesting device replicating a data operation request and transmitting the data operation request and a shared storage device shared with another node device, the node device including: the processing device; a permanent storage device; and a temporary storage device, the permanent storage device including: a data record storage unit storing a data record; and an update history storage unit storing a post-update log of the data record, causes the computer to function as:

data operation means for transmitting a response to the data operation requesting device when writing, to the temporary storage device of an own node, the post-update log of the data record on executing the operation requested by the data operation request; and checkpoint processing means for, when a checkpoint time comes, updating the data record storage unit of the own node on a basis of the post-update log of the data record stored in the temporary storage device of the own node, writing, to the update history storage unit of the own node, the post-update log of the data record stored in the temporary storage device of the own node, and writing, to the shared storage device, checkpoint information including information identifying a latest post-update log written to the update history storage unit.

A program according to a sixth aspect of the present invention for a computer with which a management device is configured, the management device being in a data replicating system, the data replicating system includes: a plurality of nodes; and a shared storage device accessible from the plurality of nodes, the management device connected to the plurality of nodes and the shared storage device, the nodes each including: a processing device; a permanent storage device; and a temporary storage device, the nodes each receiving a data operation request from a data operation requesting device replicating the data operation request and transmitting the same data operation requests to the plurality of nodes, the permanent storage device including: a data record storage unit storing a data record; and an update history storage unit storing a post-update log of the data record, the processing device including: data operation means for transmitting a response to the data operation requesting device when writing the post-update log of the data record on execution of the operation requested by the data operation request to the temporary storage device of an own node; and checkpoint processing means for, when a checkpoint time comes, updating the data record storage unit of the own node on a basis of the post-update log of the data record stored in the temporary storage device of the own node, writing, to the update history storage unit of the own node, the post-update log of the data record stored in the temporary storage device of the own node, and writing, to the shared storage device, checkpoint information including information identifying a latest post-update log written to the update history storage unit, causes the computer to function as:

other-node-failure recovery means for reading out the checkpoint information written by the node which is failed from the shared storage device, estimating the post-update log having possibility of being lost from the temporary storage device of the node which is failed on a basis of the checkpoint information which is read out, reading out the post-update log that is same as the estimated post-update log from the update history storage unit or the temporary storage device of a node other than the node which is failed, and transmitting the post-update log which is read out as a post-update log for failure recovery to the node which is failed as a post-update log for failure recovery.

Advantageous Effects of Invention

Because the present invention has the above-mentioned configuration, it is possible to identify quickly in another node the post-update log that is the same as the post-update log lost from the failed node.

DESCRIPTION OF EMBODIMENTS

Figure 1:
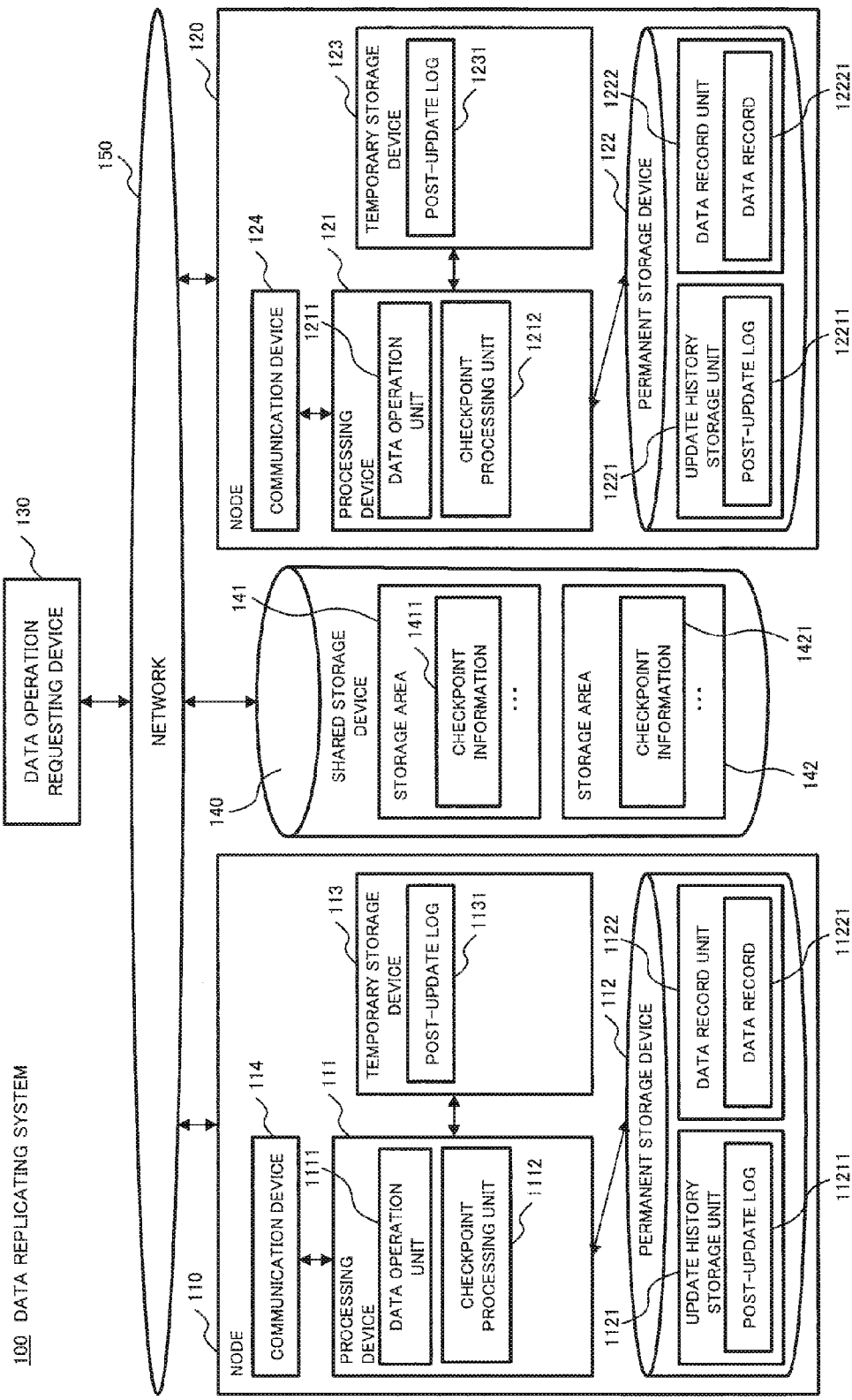
FIG. 1 is a block diagram of a data replicating system according to a first exemplary embodiment of the present invention.

Next, an exemplary embodiment of the present invention will be described in detail with reference to the drawing.

[First Exemplary Embodiment]

Referring to FIG. 1, in a data replicating system 100 according to a first exemplary embodiment of the present invention, a node 110, a node 120, a data operation requesting device 130, and a shared storage device 140 are connected with one another via a network 150. In the present exemplary embodiment, by using KVS, a replicating system, which stores the same replicated KV data in two nodes, will be described. However, the application of the present invention is not limited to KVS. For example, the present invention is applicable to the replicating of another type of database such as a relational database or the like. Further, the number of the nodes is not limited to two and may be three or more.

The data operation requesting device 130 has a function to transmit data operation requests to the nodes 110 and 120 via the network 150 and receive responses to the data operation requests from the nodes 110 and 120. When transmitting the data operation requests, the data operation requesting device 130 replicates a data operation request to generate the same data operation requests and transmits the same data operation requests replicated to the nodes 110 and 120 simultaneously.

The operation requested by the data operation request includes: a PUT operation, a GET operation, and a DELETE operation. The PUT operation is a write operation with a key and a value which are specified, the GET operation is a read operation of reading data specified by a key, and the DELETE operation is a deletion operation of deleting data with a specified key. In the present exemplary embodiment, the data replicating system 100 assigns an identifier which is able to be uniquely identified to the data operation request for the PUT operation or the DELETE operation. In this description, this identifier is defined as an operation ID. It is possible to use, as the operation ID, a combination of a key value and version information of the data that is an operation target, or a sequence number assigned by the data operation requesting device 130.

The node 110 has a function of processing the data held in an own node that is the node 110 itself according to the data operation request received from the data operation requesting device 130 and transmitting a result of processing to the data operation requesting device 130. The node 110 includes a processing device 111, a permanent storage device 112, a temporary storage device 113, and a communication device 114.

The communication device 114 is implemented with a dedicated data communication circuit and has a function to perform data communication with various devices such as the data operation requesting device 130, the other node 120, the shared storage device 140, and the like via the network 150.

The permanent storage device 112 is implemented with a non-volatile storage device such as a hard-disk device. The permanent storage device 112 includes an update history storage unit 1121 and a data record storage unit 1122. The data record storage unit 1122 stores a data record 11221. Each data record is KV data. The KV data includes a Key and a Value. The Value includes a value and version information. This version information is used for controlling atomic data writing by a CAS (Compare-And-Swap) instruction. The update history storage unit 1121 stores a post-update log 11211 of the data record 11221. The post-update log 11211 is also KV data. That is, the permanent storage device 112 is the KVS.

The temporary storage device 113 is implemented with a non-volatile storage device such as the RAM. A post-update log 1131 of WAL technique is written in the temporary storage device 113. An operation ID that is the same as the operation ID appended to the data operation request related with the post-update log 1131 is appended to the post-update log 1131. As a result, relationship between the post-update log 1131 and the data operation request becomes clear. Further, temporal order of the post-update log 1131 is identified by storing order of the post-update log 1131 in the temporary storage device 113 and the permanent storage device 112. The post-update log 1131 is implemented in a piece of KV data.

The processing device 111 includes a data operation unit 1111 and a checkpoint processing unit 1112.

The data operation unit 1111 has a function of executing a data operation request received from the data operation requesting device 130. When the type of the data operation request received from the data operation requesting device 130 is the PUT operation or the DELETE operation, the data operation unit 1111 executes a requested operation by using WAL technique. That is, when writing the post-update log 1131 of executing the PUT operation or the DELETE operation on the data record to the temporary storage device 113, assuming the writing the post-update log 1131 to be completion (commitment) of the PUT operation or the DELETE operation, the data operation unit 1111 transmits a response to the data operation requesting device 130. An actual operation of the PUT operation or the DELETE operation on the data is executed in checkpoint processing described later.

When the type of the received data operation request is the GET operation, the data operation unit 1111 searches post-update logs 1131, serially from the newest, in the temporary storage device 113 for the KV data with the key specified by the GET operation and transmits a result to the data operation requesting device 130 that is a request source. If the KV data with the key specified by the GET operation is not found in the post-update logs 1131 in the temporary storage device 113, the data operation unit 1111 searches the data record storage unit 1122 for the KV data with the key specified by the GET operation and transmits a result to the data operation requesting device 130 that is the request source.

The checkpoint processing unit 1112 has a function of performing checkpoint processing at an appropriate moment or interval. In the checkpoint processing, the checkpoint processing unit 1112 picks out the post-update logs 1131 stored in the temporary storage device 113 serially from the oldest in update time and performs the following processing. First, the checkpoint processing unit 1112 writes the picked out post-update log 1131 into the update history storage unit 1121 of the permanent storage device 112, writes, to the shared storage device 140, information (hereinafter, referred to as checkpoint information) related to the post-update log 1131 written to the update history storage unit 1121 through the communication device 114, and next, updates the data record storage unit 1122 of the permanent storage device 112 on the basis of the post-update log 1131. The checkpoint information written to the shared storage device 140 may be arbitrarily selected within information identifying the post-update log 1131 written to the update history storage unit 1121. In the present exemplary embodiment, the checkpoint information is assumed to be an operation ID in the post-update log 1131 written to the update history storage unit 1121. When a plurality of post-update logs 1131 are stored in the temporary storage device 113 at a time of the checkpoint processing, by overwriting the checkpoint information in the shared storage device 140 in order from the oldest in update time, only the operation ID of the most recent post-update log 1131 in a plurality of the post-update logs 1131 described above is recorded in the shared storage device 140. Of course, the history of the operation ID of the post-update log 1131 may be stored in the shared storage device 140 by adding instead of overwriting.

The node 120 has the same configuration and function as those of the node 110. That is, a processing device 121, a permanent storage device 122, a temporary storage device 123, and a communication device 124 which the node 120 includes have the same configuration and function as those of the processing device 111, the permanent storage device 112, the temporary storage device 113, and the communication device 114 which the node 110 includes, respectively. A data operation unit 1211 and a checkpoint processing unit 1212 which the processing device 121 includes have the same function as those of the data operation unit 1111 and the checkpoint processing unit 1112 which the processing device 111 includes, respectively. An update history storage unit 1221 and a data record storage unit 1222 of the permanent storage device 122 have the same function as those of the update history storage unit 1121 and the data record storage unit 1122 of the permanent storage device 112, respectively. Therefore, when the same data operation request is transmitted to each of the two nodes 110 and 120 from the data operation requesting device 130, the same processing is performed in both of the nodes 110 and 120.

The shared storage device 140 is implemented with a non-volatile storage device such as a hard-disk device. The shared storage device 140 includes a storage area 141 correlated with the node 110 and a storage area 142 correlated with the node 120. The storage area 141 is used for storing the checkpoint information of the node 110 and the storage area 142 is used for storing the checkpoint information of the node 120.

Next, the operation of the data replicating system 100 according to the present exemplary embodiment will be described.

When transmitting the data operation request to the node 110, the data operation requesting device 130 also transmits the same data operation request also to the other node 120. Replicating the data operation request may be performed for all types of the data operation request. Replicating may be performed for the PUT operation and the DELETE operation and the data operation request for the GET operation may be transmitted to any one of the nodes.

The described below is a description how the data operation request for the PUT operation, as an example, which is transmitted from the data operation request device 130, is processed in the nodes 110 and 120. More specifically, following is an example in case of updating the Value of data A, which is obtained from the node 110 (or the node 120) by the preceding GET operation and saving the Value in the node 110 and 120 by the PUT operation. It is assumed that a Key of the data A is key1, version information of the Value at a time of GET is 1, and the version information after the updating is "2".

The data operation requesting device 130 transmits the data operation request for the PUT operation on the data after update to the node 110 and the node 120 via the network 150.

In the node 110, the data operation request is received by the communication device 114 and transmitted to the data operation unit 1111 of the processing device 111. The data operation unit 1111 searches the temporary storage device 113 for the latest post-update log 1131 with the Key key1 included in the data operation request as the Key of the operation target data. When the search is successfully completed, if the version information in the post-update log 1131 is not 1 which is the same as the version information at the time of the GET operation, the data is already updated by another data operation request. Therefore, the data operation unit 1111 makes the data operation request be failed. In this case, the data operation unit 1111 transmits a response indicating that the data operation request is failed to the data operation requesting device 130 through the communication device 114. If the version information of the operation target data included in the post-update log 1131 is 1 which is the same as the version information at the time of the GET operation, the data operation unit 1111 changes the value in the Value to a updated value and the post-update log 1131 with the version information changed from 1 to 2 is written to the temporary storage device 113. At this time, the data operation unit 1111 appends an operation ID appended to the data operation request to the post-update log 1131 to be written to the temporary storage device 113. The data operation unit 1111 assumes completion of writing the post-update log 1131 to be the completion of the operation, and transmits the response indicating that the operation is normally completed to the data operation requesting device 130 through the communication device 114.

When the latest post-update log 1131 with the Key key1 included in the data operation request as the Key of the operation target data does not exist in the temporary storage device 113, the data operation unit 1111 reads out the KV data with the Key key1 from the data record storage unit 1122 and verifies whether or not the version information of the Value of the KV data is 1 that is the same as the version information at the time of the GET operation. If the version information is not 1 that is the same as the version information at the time of the GET operation, the data is updated by another data operation request. Therefore, the data operation unit 1111 makes this data operation request to be failed. In this case, the data operation unit 1111 transmits a response indicating that the data operation request is failed to the data operation requesting device 130 through the communication device 114. If the version information is 1 that is the same as the version information at the time of the GET operation, the data operation unit 1111 changes the value in the Value to the updated value and writes the post-update log 1131 with the version information changed from 1 to 2 to the temporary storage device 113. At this time, the data operation unit 1111 appends the operation ID appended to the data operation request to the post-update log 1131 to be written to the temporary storage device 113. The data operation unit 1111 assumes completion of writing the post-update log 1131 to be completion of the operation, and transmits a response indicating that the operation is normally completed to the data operation requesting device 130 through the communication device 114.

In the node 120, the data operation request transmitted from the data operation requesting device 130 is received by the communication device 124 and is transmitted to the data operation unit 1211 of the processing device 121. The data operation unit 1211 performs the processing similar to the processing performed by the data operation unit 1111 of the node 110, and transmits an operation result to the data operation requesting device 130.

Next, processing performed at the time of the checkpoint will be described.

When the checkpoint time comes, the checkpoint processing unit 1112 in the processing device 111 of the node 110 reads out the post-update log 1131 stored in the temporary storage device 113 serially from the oldest in update time, and performs the following processing.

First, the checkpoint processing unit 1112 writes the read post-update log 1131 to the update history storage unit 1121 of the permanent storage device 112, and writes the checkpoint information related to this written post-update log 1131 into the storage area 141 of the shared storage device 140 through the communication device 114. Next, the checkpoint processing unit 1112 updates the data record storage unit 1122 of the permanent storage device 112 on the basis of the read post-update log 1131. For example, when the post-update log 1131 is a log related to the KV data with the Key key1, the checkpoint processing unit 1112 updates the Value of the data record 11221 with the Key key1 in the data record storage unit 1122 with the updated Value in the post-update log 1131.

Next, a method of identifying, when one of the nodes is failed, the post-update log lost from the failed node for a normal node other than the failed node that is the node which is failed will be described.

Figure 2:
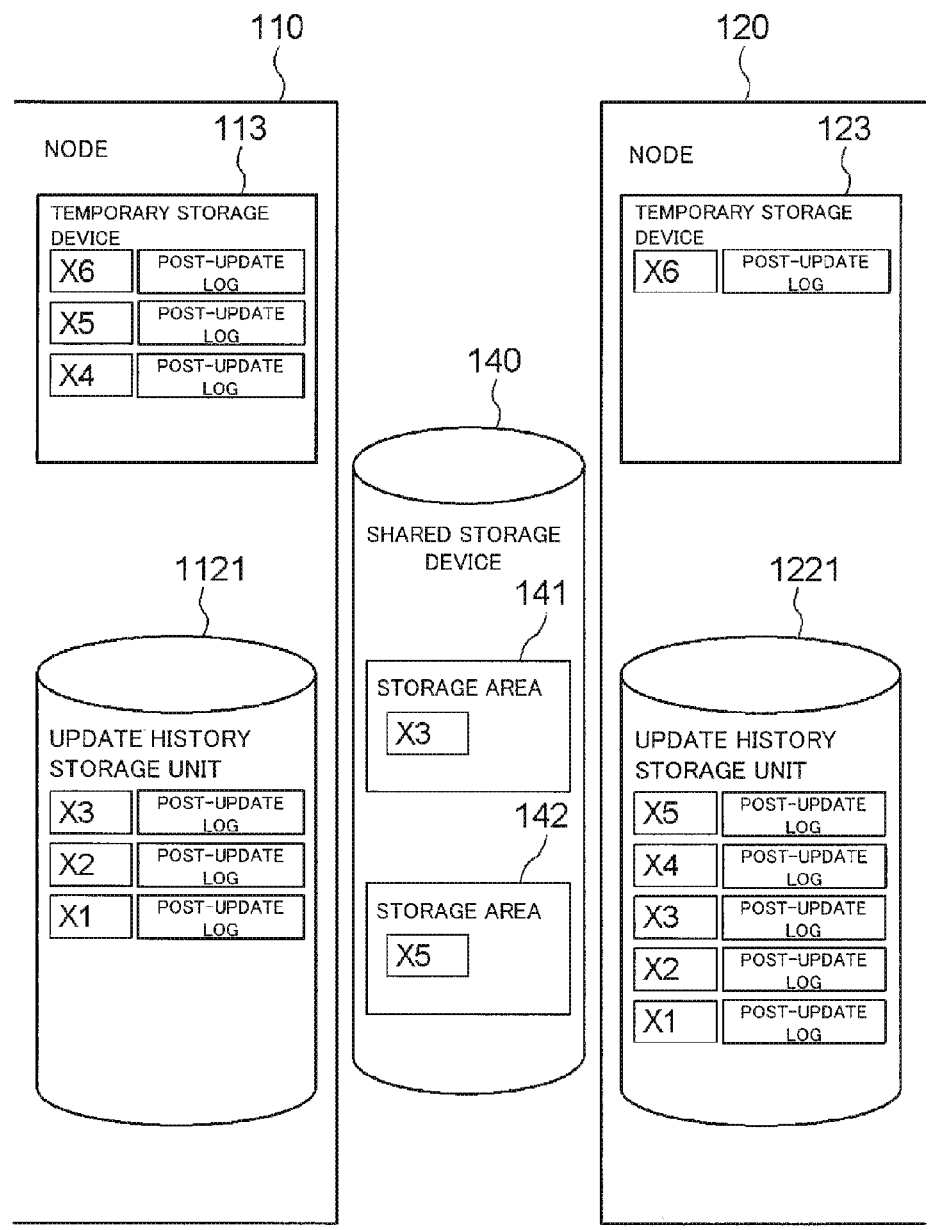
FIG. 2 is a schematic figure of an example of a state of each unit of the data replicating system according to the first exemplary embodiment of the present invention.

FIG. 2 is a schematic diagram showing an example of states of the units of the data replicating system 100, and shows states of the temporary storage device 113 and the update history storage unit 1121 of the node 110, states of the temporary storage device 123 and the update history storage unit 1221 of the node 120, and states of the storage areas 141 and 142 of the shared storage device 140. In this example, the post-update logs with the operation IDs from X1 to X3 are written to the update history storage unit 1121 of the node 110, and the post-update logs with the operation IDs from X4 to X6 are written to the temporary storage device 113. The post-update logs with the operation IDs from X1 to X5 are written to the update history storage unit 1221 of the node 120, and the post-update log with the operation ID of X6 is written to the temporary storage device 123. X3 is written into the storage area 141 of the shared storage device 140. X3 is the operation ID of the last post-update log written in the checkpoint processing most recently performed among the post-update logs written to the update history storage unit 1121. X5 is written into the storage area 142. X5 is the operation ID of the last post-update log written in the checkpoint processing most recently performed among the post-update logs written to the update history storage unit 1221.

Figure 3:
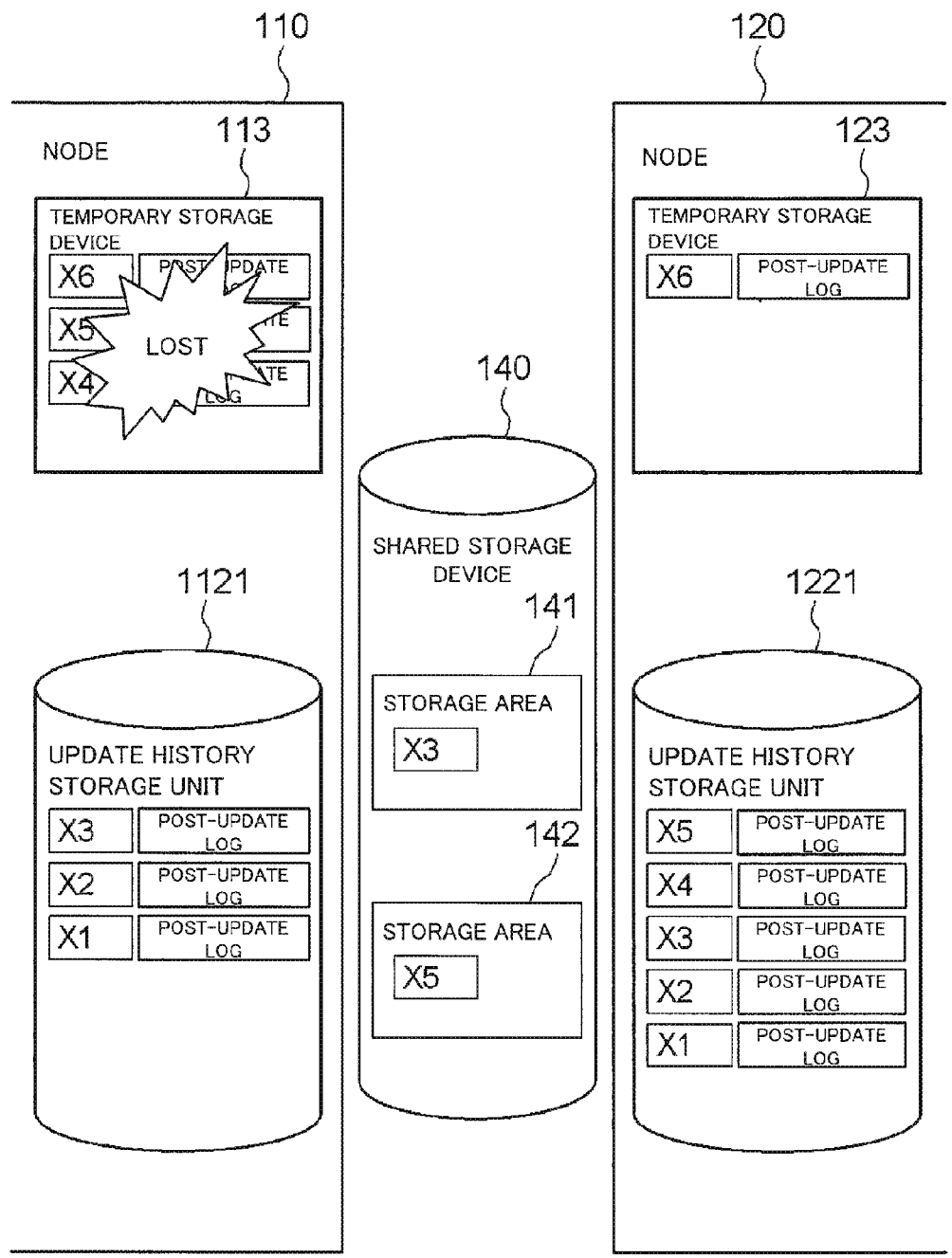
FIG. 3 is a schematic figure of an example of a state that a node fails in the data replicating system according to the first exemplary embodiment of the present invention.

FIG. 3 is a diagram showing a situation when the node 110 is failed in a state shown in FIG. 2. In the node 110, all the post-update logs are lost because the temporary storage device 112 is a volatile storage device. The stored content is maintained in the update history storage unit 1121 and the shared storage device 140 which are the non-volatile storage devices, and in the temporary storage device 123 and the update history storage unit 1221 of the node 120 in which is not failed. Therefore, by referring to the storage area 141 for the node 110 in the shared storage device 140 via the network 150 from the node 120 by, for example, an operator operation on a side of the node 110, it is possible to obtain the operation ID X3 as the operation ID of the last post-update log written to the update history storage unit 1121 before the node 110 is failed. Accordingly, the post-update log lost due to a failure in the node 110 proves to be the post-update log with the operation ID newer than X3, that is, the post-update logs with the operation IDs from X4 to X6.

Thus, according to the present exemplary embodiment, it is possible to identify quickly in another node the post-update log lost from the failed node. This is because when the checkpoint comes, the checkpoint processing unit of each of the nodes writes the post-update log stored in the temporary storage device into the update history storage unit of the own node, that is, for units included in a node, the node including the units, and writes to the shared storage device the checkpoint information related with the written post-update log written to the own node.

In particular, it is possible to minimize an amount of checkpoint information written to the shared storage device and to easily identify the post-update log which is lost by appending the operation ID to the data operation request, appending this operation ID to the post-update log and writing the operation ID to the temporary storage device and to the update history storage unit, and writing to the shared storage device as the checkpoint information the operation ID of the latest post-update log written to the update history storage unit.

[Second Exemplary Embodiment]

Figure 4:
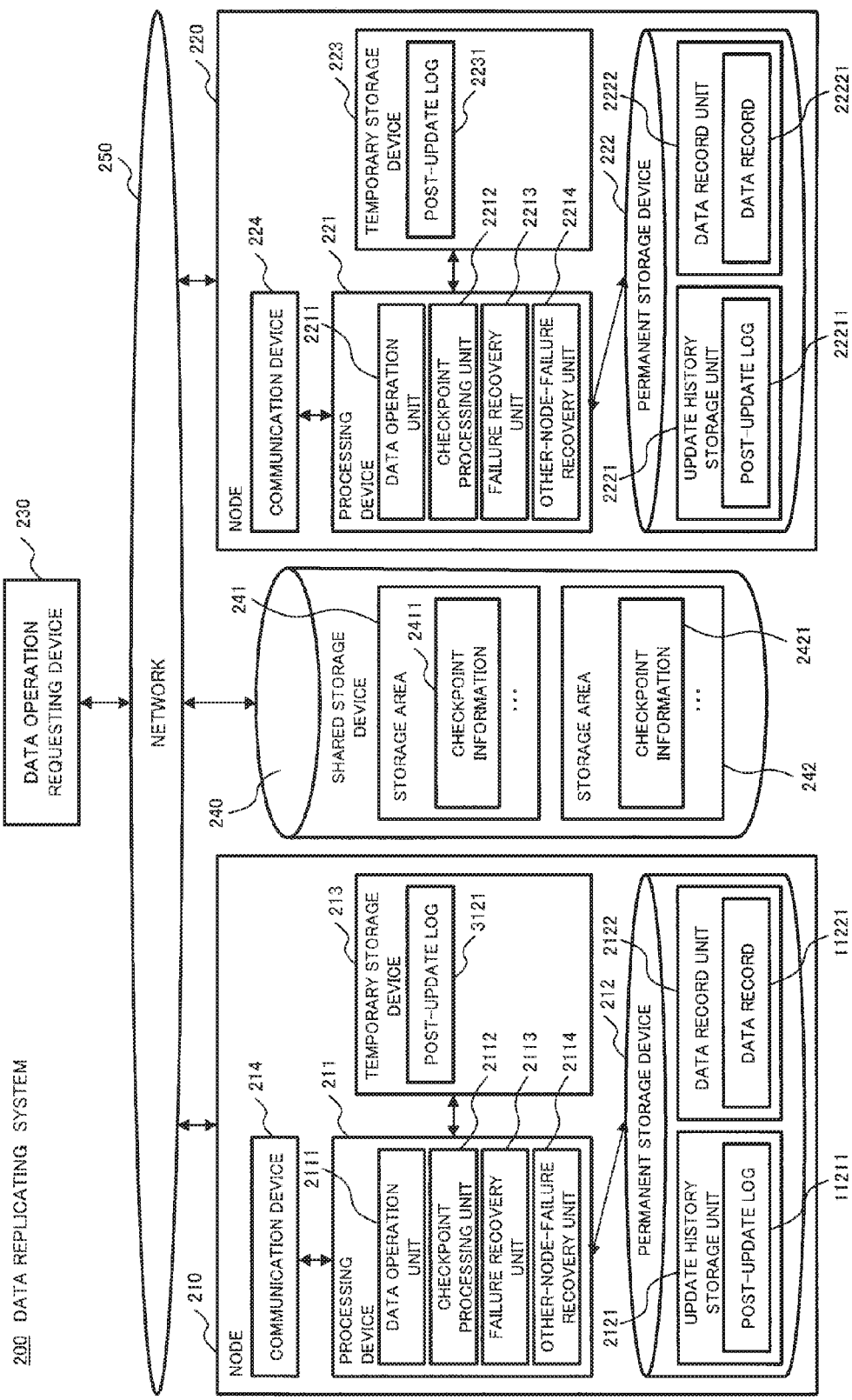
FIG. 4 is a block diagram of a data replicating system according to a second exemplary embodiment of the present invention.

Referring to FIG. 4, in a data replicating system 200 according to a second exemplary embodiment of the present invention, a node 210, a node 220, a data operation requesting device 230, and a shared storage device 240 are connected with one another via a network 250. The data operation requesting device 230, the shared storage device 240, and the network 250 are the same as the data operation requesting device 130, the shared storage device 140, and the network 150, respectively, of the first exemplary embodiment shown in FIG. 1.

The node 210 includes a processing device 211, a permanent storage device 212, a temporary storage device 213, and a communication device 214. The permanent storage device 212, the temporary storage device 213, and the communication device 214 are the same as the permanent storage device 112, the temporary storage device 113, and the communication device 114, respectively, of the first exemplary embodiment shown in FIG. 1.

The processing device 211 includes a data operation unit 2111, a checkpoint processing unit 2112, a failure recovery unit 2113, and an other-node-failure recovery unit 2114. The data operation unit 2111 and the checkpoint processing unit 2112 are the same as the data operation unit 1111 and the checkpoint processing unit 1112, respectively, of the first exemplary embodiment shown in FIG. 1, respectively.

The failure recovery unit 2113 has a function to perform a failure recovery processing for the own node by using the post-update log received from another node via the network 250.

The other-node-failure recovery unit 2114 has a function of identifying the post-update log lost from another node which is failed and a function of transmitting the post-update log, corresponding to the identified post-update log, of the own node to the failed node.

The node 220 has the same configuration and function as those of the node 210. That is, the processing device 221, the permanent storage device 222, the temporary storage device 223, and the communication device 224 which the node 220 includes have the same configuration and function as those of the processing device 211, the permanent storage device 212, the temporary storage device 213, and the communication device 214, respectively, which the node 210 includes. A data operation unit 2211, a checkpoint processing unit 2212, a failure recovery unit 2213, and an other-node-failure recovery unit 2214 which the processing device 221 includes have the same function as that of the data operation unit 2111, the checkpoint processing unit 2112, the failure recovery unit 2113, and the other-node-failure recovery unit 2114, respectively, which the processing device 211 includes. An update history storage unit 2221 and a data record storage unit 2222 of a permanent storage device 222 have the same function as that of an update history storage unit 2121 and a data record storage unit 2122, respectively, which the permanent storage device 212 includes.

Next, the operation of the data replicating system 200 according to the present exemplary embodiment will be described. Among the operations of the data replicating system 200 according to the present exemplary embodiment, the operations other than the operations of the failure recovery units 2113 and 2213 and the other-node-failure recovery units 2114 and 2214 are the same as those of the data replicating system 100 according to the first exemplary embodiment shown in FIG. 1.

Next, following is a description of operations of the failure recovery units 2113 and 2213 and the other-node-failure recovery units 2114 and 2214 in a case, as an example, that the node 210 is failed.

Figure 5:
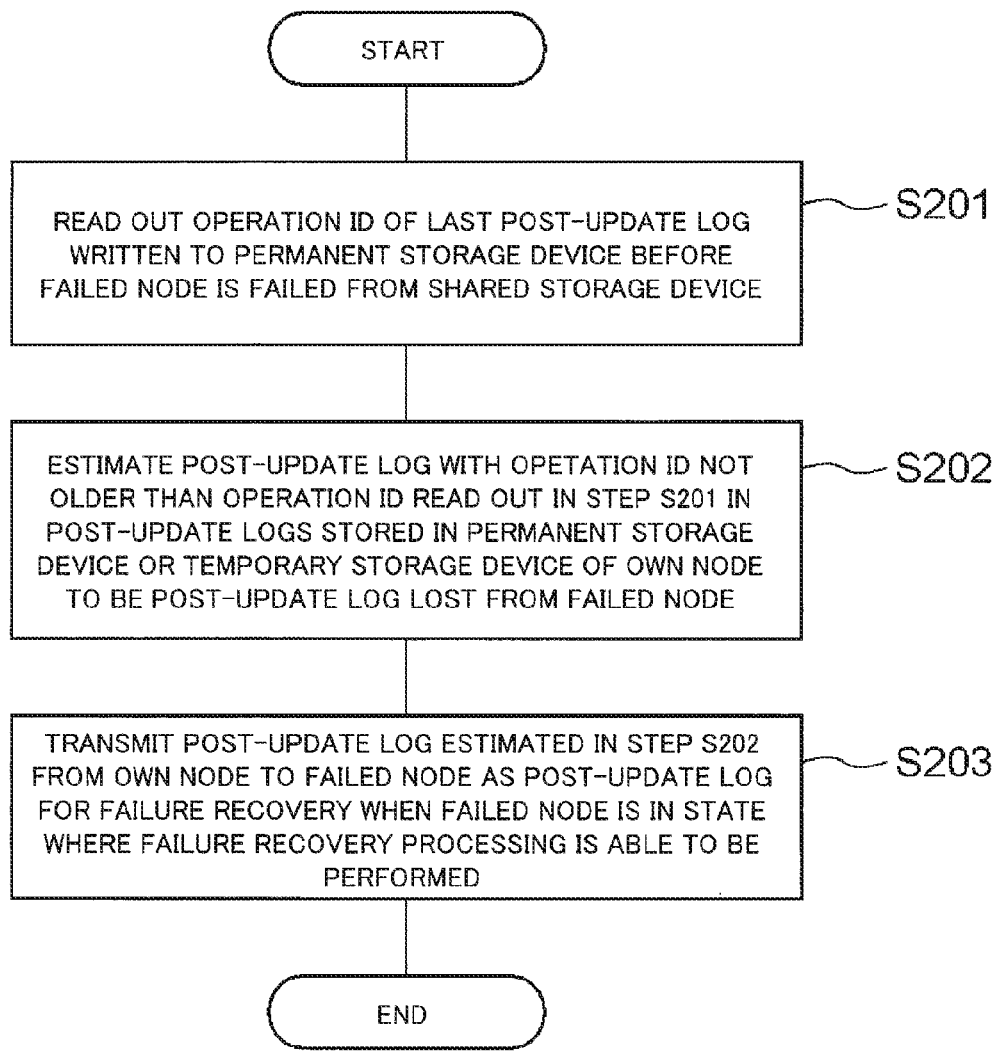
FIG. 5 is a flowchart showing an example of processing performed by an other-node-failure recovery unit according to a second exemplary embodiment of the present invention.

FIG. 5 is a flowchart showing an example of a processing by the other-node-failure recovery unit. The operation of the other-node-failure recovery unit 2214 in the processing device 221 of the node 220 will be described below with reference to FIG. 5. When detecting the node 210 being failed by a notification by an operator, suspension of a heartbeat signal periodically received from the node 210, or the like, the other-node-failure recovery unit 2214 starts the processing shown in FIG. 5. First, the other-node-failure recovery unit 2214 accesses the storage area 241 for the node 210 of the shared storage device 240 through the communication device 224 via the network 250, and reads out the operation ID of the last post-update log written by the node 210 to the update history storage unit 2121 before the node 210 is failed (Step S201).

Next, the other-node-failure recovery unit 2214 estimates, in the post-update logs stored in the update history storage unit 2221 and the temporary storage unit 223 of the own node, the post-update log with the operation ID not older than the operation ID read out in step S201 as the post-update log lost from the node 201 (Step S202).

Next, when detecting the failed node 210 being in a state where a failure recovery processing is able to be performed by notifying by the operator, receiving a heartbeat signal from the node 210, or the like, the other-node-failure recovery unit 2214 reads out the post-update log, corresponding to the post-update log estimated as above, of the own node from the temporary storage device 223 or the update history storage unit 2221, and transmits the post-update log which is read out to the node 210 via the network 250 through the communication device 224 (S203).

Figure 6:
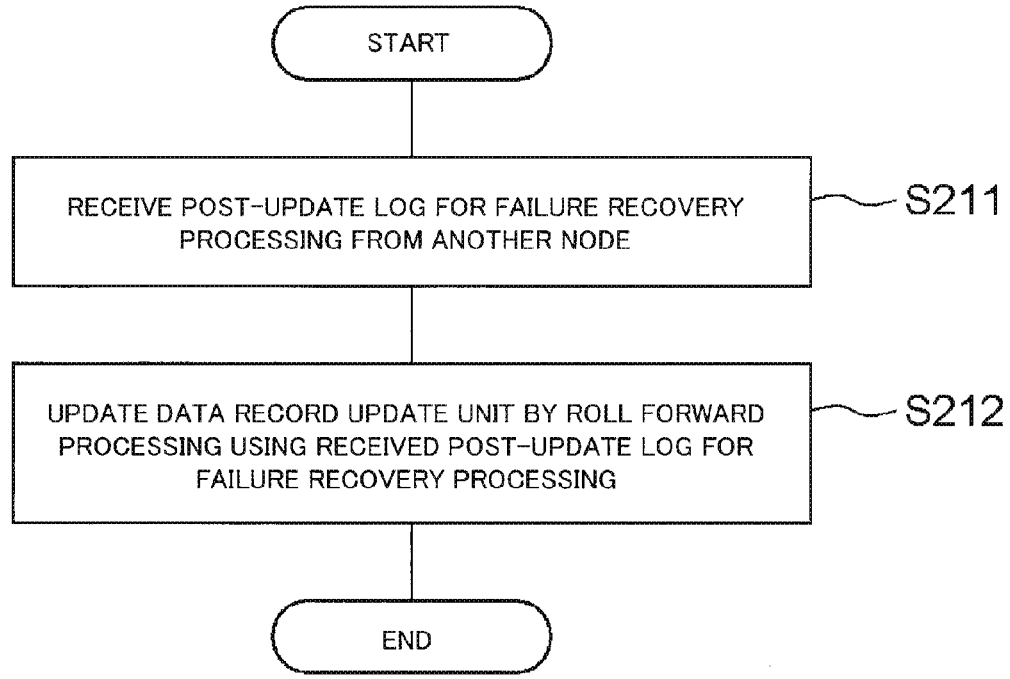
FIG. 6 is a flowchart showing an example of processing performed by a failure recovery unit according to the second exemplary embodiment of the present invention.

FIG. 6 is a flowchart showing an example of a processing performed by the failure recovery unit. The operation of the failure recovery unit 2113 in the processing device 211 of the node 210 will be described below with reference to FIG. 6. First, the failure recovery unit 2113 of the node 210 receives from the communication device 214 the post-update log to be used for the failure recovery, which is transmitted by the node 220 (S211). Next, the failure recovery unit 2113 updates the data record storage unit 2122 by a roll forward processing by using the received post-update log and the data record stored in the data record storage unit 2122 (Step S212). This processing reflects in the data record storage unit 2122 all the PUT operations and the DELETE operations that are committed by the node 210 before the node 210 is failed and are not reflected in the data record storage unit 2122. As a result, the state of the node 210 becomes a state synchronized with a state of the node 220, and the node 210 recovers from a failure state.

Thus, according to the present exemplary embodiment, it is possible to obtain an effect similar to that of the first exemplary embodiment, and it is possible to perform the failure recovery processing automatically by transmitting the post-update log corresponding to the post-update log lost from the failed node from another node to the failed node.

[Third Exemplary Embodiment]

Figure 7:
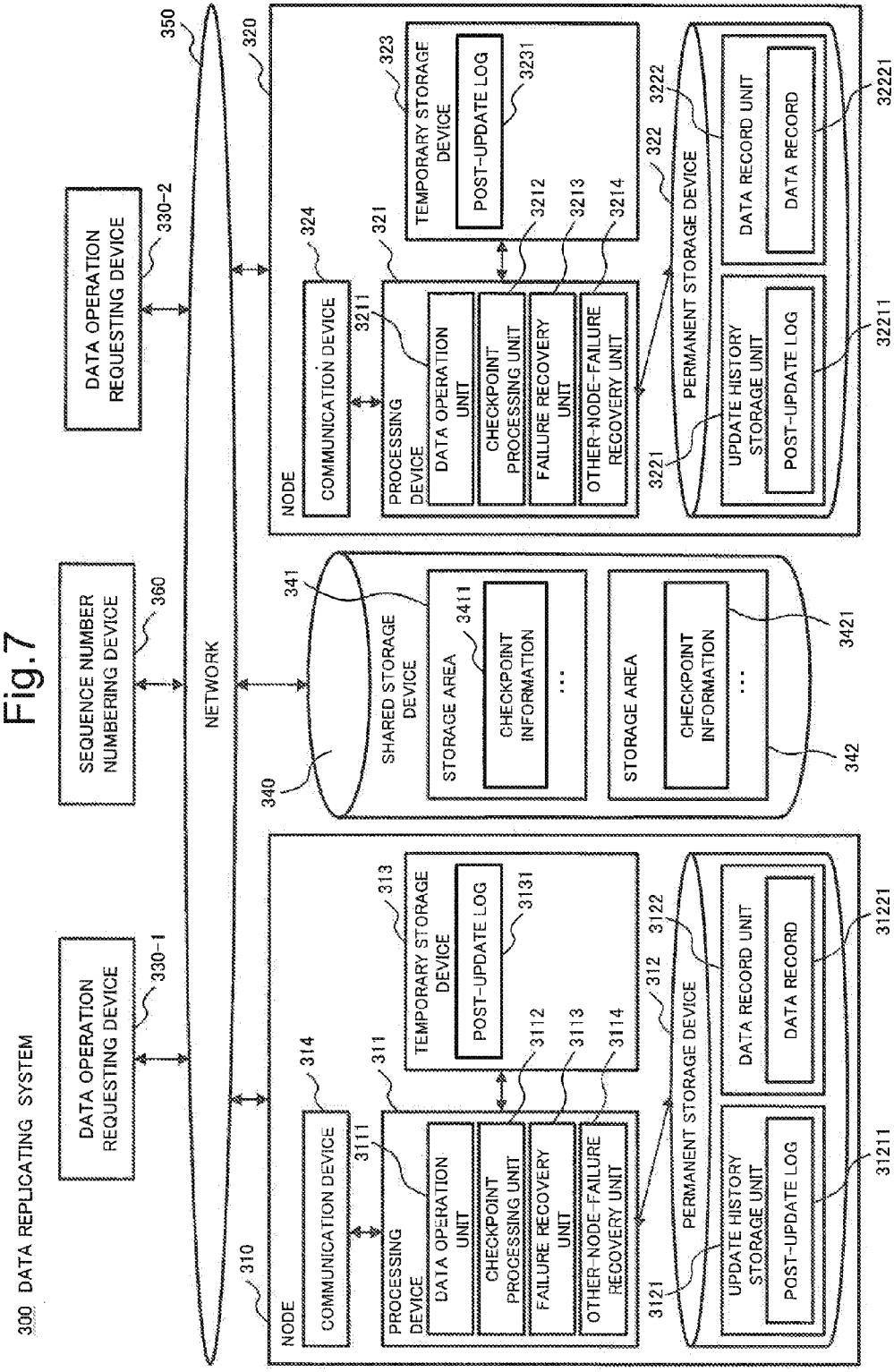
FIG. 7 is a block diagram of a data replicating system according to a third exemplary embodiment of the present invention.

Referring to FIG. 7, in a data replicating system 300 according to a third exemplary embodiment of the present invention, a node 310, a node 320, a data operation requesting device 330-1, a data operation requesting device 330-2, a shared storage device 340, and a sequence number numbering device 360 are connected with one another via a network 350. The shared storage device 340 and the network 350 are the same as the shared storage device 240 and the network 250, respectively, of the second exemplary embodiment shown in FIG. 4.

The data operation requesting device 330-1 has a function of transmitting the data operation request to the nodes 310 and 320 via the network 350 and of receiving a response to the data operation request from the nodes 310 and 320. When transmitting the data operation request, the data operation requesting device 330-1 transmits a number assignment request to the sequence number numbering device 360, obtains a sequence number unique in the data replicating system 300, appends this sequence number as the operation ID to the data operation request, replicates the data operation request, and transmits the same data operation requests to the node 310 and the node 320 at the same time.

The data operation requesting device 330-2 has a function similar to that of the data operation requesting device 330-1.

Each time the sequence number numbering device 360 is requested to assign a sequence number by the data operation requesting device 330-1 or the data operation requesting device 330-2, the sequence number numbering device 360 newly assigns a sequence number unique in the data replicating system 300, and provides the sequence number for the data operation requesting device that is the request source. For example, each time the sequence number numbering device 360 is requested to assign a sequence number, the sequence number numbering device 360 generates a sequence number by adding one to the most recently assigned sequence number and provides the generated sequence number.

The node 310 includes a processing device 311, a permanent storage device 312, a temporary storage device 313, and a communication device 314. The permanent storage device 312, the temporary storage device 313, and the communication device 314 are the same as the permanent storage device 212, the temporary storage device 213, and the communication device 214 according to the second exemplary embodiment shown in FIG. 4, respectively.

The processing device 311 includes a data operation unit 3111, a checkpoint processing unit 3112, a failure recovery unit 3113, and an other-node-failure recovery unit 3114. The checkpoint processing unit 3112, the failure recovery unit 3113, and the other-node-failure recovery unit 3114 are the same as the checkpoint processing unit 2112, the failure recovery unit 2113, and the other-node-failure recovery unit 2114, respectively, of the second exemplary embodiment shown in FIG. 4.

The data operation unit 3111 has a function of performing an operation requested by the data operation request received from the data operation requesting device 330-1 or the data operation requesting device 330-2 in order of the sequence number appended to the data operation request. That is, the data operation unit 1111 processes the data operation request in order of the sequence number that is appended to the data operation request, not in order of arrival of the data operation request. The data operation unit 3111 has a function to perform the PUT operation and the DELETE operation by using WAL technique.

The node 320 has the same configuration and function as those of the node 310. That is, a processing device 321, a permanent storage device 322, a temporary storage device 323, and a communication device 324 which the node 320 includes have the same configuration and function as those of the processing device 311, the permanent storage device 312, the temporary storage device 313, and the communication device 314, respectively, which the node 310 includes. A data operation unit 3211, a checkpoint processing unit 3212, a failure recovery unit 3213, and an other-node-failure recovery unit 3214 which the processing device 321 includes have the same function as that of the data operation unit 3111, the checkpoint processing unit 3112, the failure recovery unit 3113, and the other-node-failure recovery unit 3114, respectively, which the processing device 311 includes. An update history storage unit 3221 and a data record storage unit 3222 which the permanent storage device 322 includes have the same function as that of an update history storage unit 3121 and a data record storage unit 3122, respectively, which the permanent storage device 312 includes.

Next, the operation of the data replicating system 300 according to the present exemplary embodiment will be described. In operations of the data replicating system 300 according to the present exemplary embodiment, an operation other than the operations of the data operation requesting devices 330-1 and 330-2, the sequence number numbering device 360, and the data operation units 3111 and 3211 is the same as that of the data replicating system 200 according to the second exemplary embodiment shown in FIG. 4.

Next, the operations of the data operation requesting devices 330-1 and 330-2 and the sequence number numbering device 360 will be described.

When transmitting the data operation request, the data operation requesting devices 330-1 and 330-2 request the sequence number numbering device 360 to assign a sequence number. The sequence number numbering device 360 assigns a sequence number in response to the request and provides the sequence number to the data operation requesting devices 330-1 or 330-2 that is the request sources. The data operation requesting devices 330-1 and 330-2 append the obtained sequence number to the data operation request as the operation ID, and transmit the same data operation requests to the node 310 and the node 320 at the same time.

Figure 8:
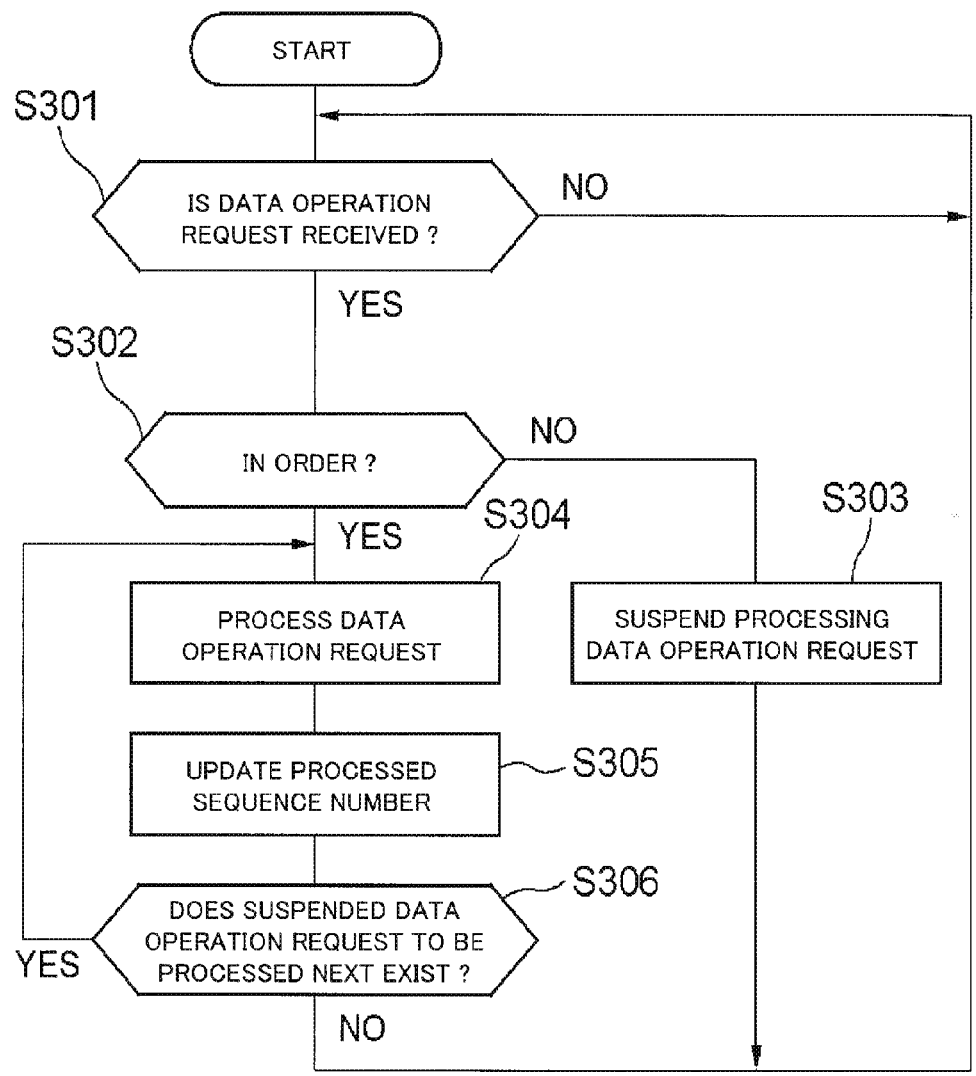
FIG. 8 is a flowchart showing an example of processing performed by a data operation unit according to the third exemplary embodiment of the present invention.

FIG. 8 is a flowchart showing an example of a process performed by the data operation unit. Next, the operation of the data operation unit 3111 of the node 310 will be described with reference to FIG. 8.

When receiving a new data operation request from the data operation requesting devices 330-1 or 330-2 through the communication device 314 (Step S301), the data operation unit 3111 compares the newest performed sequence number stored in the data operation unit 3111 with the sequence number appended to the received data operation request, and determines whether or not the data operation request received at this time is the data operation request to be processed next according to the order of the sequence number (Step S302).

When the received data operation request is not the data operation request to be processed next according to the order of the sequence number, the data operation unit 3111 suspends processing the data operation request received at this time and stores the data operation request inside (Step S303). The processing returns to step S301, and the data operation unit 3111 waits to receive a new data operation request.

When the received data operation request is the data operation request to be processed next according to the order of the sequence number, the data operation unit 3111 processes this data operation request (Step S304). When the data operation request is the PUT operation or the DELETE operation, the data operation unit 3111 processes the data operation request by using WAL technique. Next, the data operation unit 3111 updates the newest performed sequence number stored in the data operation unit 3111 itself (Step S305), and confirms or not the data operation request to be processed next according to the order of the sequence number exists in the suspended data operation requests (Step S306). When a suspended data operation request to be processed next exists, the data operation unit 3111 picks out the suspended data operation request and processes the suspended data operation request (Step S304). And the data operation unit 3111 repeats the processing of steps S305 and S306 again. In the processing of step S306, when the data operation request to be processed next turns out to be absent in the suspended data operation requests, the processing of the data operation unit 3111 returns to step S301, and the data operation unit 3111 waits to receive a new data operation request.

Thus, according to the present exemplary embodiment, it is possible to obtain an effect similar to that of the second exemplary embodiment, and even when a plurality of the data operation requesting devices exist and order of arrival of the data operation requests is different for each node, it is possible to prevent the occurrence of data inconsistency in the plurality of nodes and it is possible to perform replicating data without trouble. The reason will be described below.

When there is one data operation requesting device, order of processing the data operation request in the node 310 is the same as that in the node 320. However, When there are a plurality of the data operation requesting devices, a data operation request X1 outputted by the data operation requesting device 330-1 does not always arrive at both of the node 310 and 320 earlier than a data operation request X2 which is outputted later than the data operation request X1 by the data operation requesting device 330-2. The following case may occur: the data operation request X1 arrives first and the data operation request X2 arrives next at the node 310, and the data operation request X2 arrives first and the data operation request X1 arrives next at the node 320. For this reason, if the nodes 310 and 320 process the data operation requests in order of arrival, when the data operation requests X1 and X2 target KV data with the same Key for processing with the PUT operation or the DELETE operation, data inconsistency between the node 310 and the node 320 occurs. However, in the present exemplary embodiment, because each of the nodes 310 and 320 processes the data operation requests X1 and X2 not in order of the arrival but in order of the assigned sequence number, the data inconsistency in a plurality of nodes does not occur. Because a GET operation outputted later is not processed earlier than a PUT operation outputted earlier when they are for the same Key, outdated data is prevented from being obtained by a GET operation.

In the present exemplary embodiment, because each of the nodes 310 and 320 processes all the data operation requests in order of the sequence number, time series of the post-update log is the same in the node 310 and in the node 320. As a result, in the exemplary embodiment, similarly to the first exemplary embodiment, it is possible to minimize the amount of the checkpoint information written to the shared storage device, and it is possible to easily identify the post-update log which is lost.

[Fourth Exemplary Embodiment]

Figure 9:
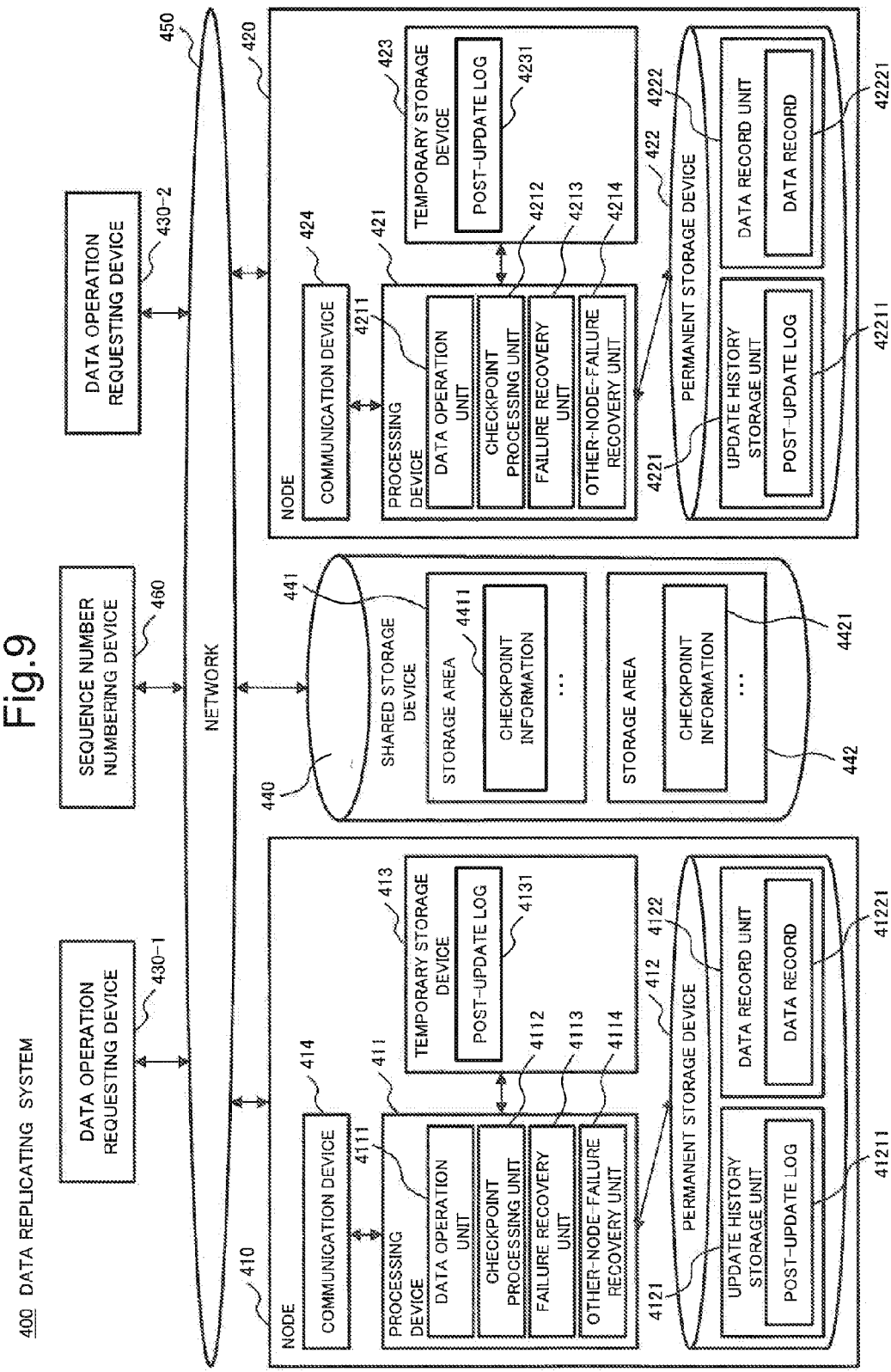
FIG. 9 is a block diagram of a data replicating system according to a fourth exemplary embodiment of the present invention.

Referring to FIG. 9, in a data replicating system 400 according to a fourth exemplary embodiment of the present invention, a node 410, a node 420, a data operation requesting device 430-1, a data operation requesting device 430-2, a shared storage device 440, and a sequence number numbering device 460 are connected to one another via a network 450.

The data operation requesting device 430-1 has a function of transmitting a data operation request to each of the nodes 410 and 420 via the network 450 and receiving a response to the data operation requests from each of the nodes 410 and 420. When transmitting of the data operation request, the data operation requesting device 430-1 transmits a number assignment request identifying a Key of data that is an operation target to the sequence number numbering device 460, obtains a sequence number unique to the Key in the data replicating system 400, appends this sequence number to the data operation request as the operation ID, replicates the data operation request, and transmits the same data operation request to the node 410 and the node 420 at the same time.

The data operation requesting device 430-2 has a function similar to that of the data operation requesting device 430-1.

When the sequence number numbering device 460 is requested to assign a sequence number by the data operation requesting device 430-1 or the data operation requesting device 430-2, the sequence number numbering device 460 newly assigns a sequence number unique to a Key in the data replicating system 400, and provides the sequence number to the data operation requesting device that is the request source. For example, when a sequence number is requested to assign with identifying a certain Key key1, the sequence number numbering device 460 generates a sequence number by adding one to a sequence number provided for the just previous acquisition request identifying the same Key key1 and provides the generated sequence number.

The node 410 includes a processing device 411, a permanent storage device 412, a temporary storage device 413, and a communication device 414. The permanent storage device 412, the temporary storage device 413, and the communication device 414 are the same as the permanent storage device 312, the temporary storage device 313, and the communication device 314, respectively, of the third exemplary embodiment shown in FIG. 7.

The processing device 411 includes a data operation unit 4111, a checkpoint processing unit 4112, a failure recovery unit 4113, and an other-node-failure recovery unit 4114.

The data operation unit 4111 has a function of processing the data operation request received from the data operation requesting device 430-1 or the data operation requesting device 430-2 in order of the sequence number appended to the data operation request. In the present exemplary embodiment, a sequence number is assigned to the data operation request uniquely to a Key of data that is the operation target. Therefore, the data operation unit 4111 processes the data operation requests for operations on KV data with the same Key not in order of arrival but in order of the appended sequence number. Accordingly, data inconsistency between the node 410 and the node 420 is prevented. The data operation unit 4111 processes the data operation requests for operations on KV data with different keys in order of arrival. As a result, a useless wait is avoided.

However, because the data operation unit 4111 processes the data operation requests for operations on KV data with different keys in order of the arrival, when order of arrival of data operation requests at the node 410 is different from order of arrival of the data operation requests at the node 420, the time series of the post-update log 4131 of the node 410 is different the time series of the post-update log 4131 of the node 420. Therefore, according to a method of extracting, when one of two nodes recovers from a failure, from the time series of the post-update logs of the other normal node, logs not older than the post-update log corresponding to the last post-update log written to the permanent storage device by the failed node, it is not always possible to extract all the post-update logs lost from the failed node, and some data may not be recovered. Therefore, in the present exemplary embodiment, the post-update logs with an extra are extracted from the normal node by allowing a margin. An amount of the extra that is extracted, and information used for extracting the extra, and the like will be described later.

The checkpoint processing unit 4112 has a function of performing a checkpoint processing in an appropriate interval. The checkpoint processing performed by the checkpoint processing unit 4112 is the same as the checkpoint processing performed by the checkpoint processing unit 3112 according to the third exemplary embodiment except for the checkpoint information written to the shared storage device 440. The checkpoint processing unit 4112 writes, to the storage area 441 of the shared storage device 440 as the checkpoint information, a list including the operation IDs appended to the post-update logs 4131 written to a update history storage unit 4121 of the permanent storage device 412 in order of the update and times at which checkpoints come.

The failure recovery unit 4113 has a function of performing the failure recovery processing of the own node by using the post-update log received from another node via the network 450.

The other-node-failure recovery unit 4114 has a function of identifying the post-update log lost from another node which is failed, and a function of transmitting the post-update log, corresponding to the post-update log which is identified, of the own node to the failed node.

The node 420 has the same configuration and function as those of the node 410. That is, a processing device 421, a permanent storage device 422, a temporary storage device 423, and a communication device 424 which the node 420 includes have the same configuration and function as those of the processing device 411, the permanent storage device 412, the temporary storage device 413, and the communication device 414, respectively, which the node 410 includes. A data operation unit 4211, a checkpoint processing unit 4212, a failure recovery unit 4213, and an other-node-failure recovery unit 4214 which the processing device 421 includes have the same function as that of the data operation unit 4111, the checkpoint processing unit 4112, the failure recovery unit 4113, and the other-node-failure recovery unit 4114, respectively, which the processing device 411 includes. An update history storage unit 4221 and a data record storage unit 4222 which the permanent storage device 422 includes have the same function as that of an update history storage unit 4121 and a data record storage unit 4122, respectively, which the permanent storage device 412 includes.

Next, the operation of the data replicating system 400 according to the present exemplary embodiment will be described.

First, operations of the data operation requesting devices 430-1 and 430-2 and the sequence number numbering device 460 will be described.

When transmitting the data operation request, the data operation requesting devices 430-1 and 430-2 perform requesting the sequence number numbering device 460 to assign a sequence number with specifying the Key of the data that is the operation target. The sequence number numbering device 460 assigns a sequence number depending on the Key in response to the requesting, and provides the sequence number to the data operation requesting device 430-1 or 430-2 that are the request sources. The data operation requesting devices 430-1 and 430-2 append the obtained sequence number to the data operation request as the operation ID, and transmit the same data operation request to the node 410 and the node 420 at the same time.

Figure 10:
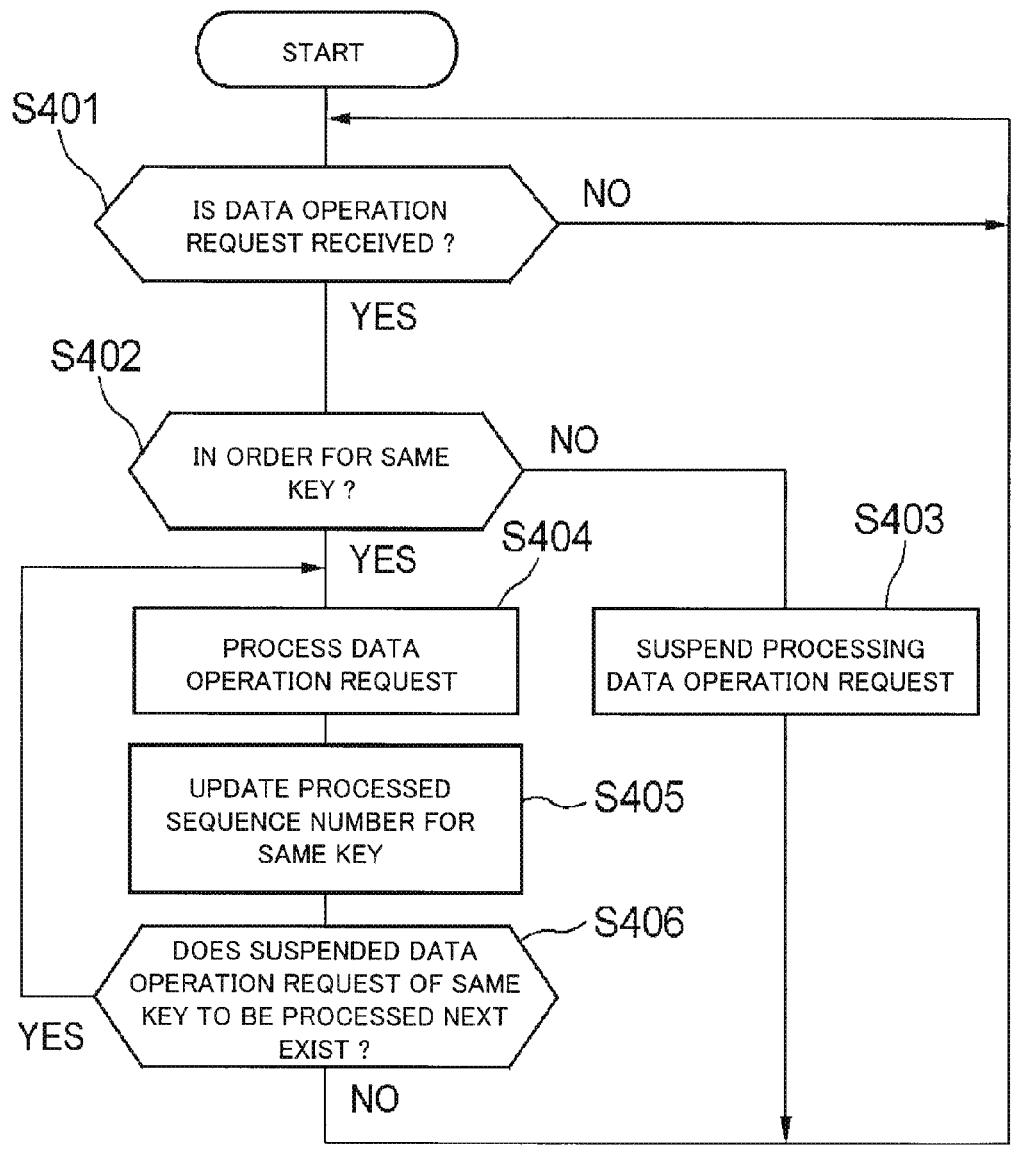
FIG. 10 is a flowchart showing an example of processing performed by a data operation unit according to the fourth exemplary embodiment of the present invention.

FIG. 10 is a flowchart showing an example of processing performed by the data operation unit. Next, the operation of the data operation unit 4111 of the node 410 will be described with reference to FIG. 10. An operation of the data operation unit 4211 of the node 420 is the same as that of the data operation unit 4111 of the node 410.

When receiving the new data operation request from the data operation requesting device 430-1 or 430-2 through the communication device 414 (Step S401), the data operation unit 4111 compares the newest processed sequence number, which the data operation unit 411 stores, concerning the Key that is the same as that of the new data operation request with the sequence number appended to the received data operation request, and determines whether or not the data operation request received at this time is the data operation request to be processed next according to the order of the sequence number for the same Key (Step S402).

When the data operation request received at this time is not the data operation request to be processed next according to the order of the sequence number for the same Key, the data operation unit 4111 suspends processing the data operation request received at this time and stores the data operation request inside separately for Keys (Step S403). The process returns to step S401, and the data operation unit 4111 waits to receive a new data operation request.

When the data operation request received at this time is the data operation request to be processed next according to the order of the sequence number, the data operation unit 4111 processes the data operation request (Step S404). At this time, the data operation unit 4111 processes the data operation request for the PUT operation or the DELETE operation by using WAL technique. Next, the data operation unit 4111 updates the latest processed sequence number stored in the data operation unit 4111 for the same Key (Step S405), and confirms whether or not the data operation request to be processed next according to the order of the sequence number exists in the suspended data operation requests with the same Key (Step S406). When the suspended data operation request to be processed next exists, the data operation unit 4111 picks out the suspended data operation request and processes the data operation request picked out (Step S404). Then the data operation unit 4111 repeats the processing of steps S405 and S406 again. In the processing of Step S406, when it is determined that the data operation request to be processed next turns out not to exist in the suspended data operation requests, the processing of the data operation unit 4111 returns to Step S401, and the data operation unit 4111 waits to receive a new data operation request.

Next, an operation of the checkpoint processing unit 4112 of the node 410 will be described. The operation of the checkpoint processing unit 4212 of the node 420 is the same as that of the checkpoint processing unit 4212 of the node 410.

When a checkpoint comes, the checkpoint processing unit 4112 reads out the post-update log 4131 stored in the temporary storage device 413 in order of update time from the oldest, and performs the following processing on the post-update logs 4131 separately.

First, the checkpoint processing unit 4112 writes the post-update log 4131 which is read out to the update history storage unit 4121 of the permanent storage device 412, and adds the operation ID which is appended to the written post-update log 4131 to a list (whose initial state is NULL). Next, the checkpoint processing unit 4112 updates the data record storage unit 4122 of the permanent storage device 412 on the basis of the post-update log 4131 which is read out. The checkpoint processing unit 4112 repeats such processing for each of the post-update logs 4131. When finishing processing the last post-update log, the checkpoint processing unit 4112 adds the time of the checkpoint this time to the list, and writes the list into the storage area 441 of the shared storage device 440 through the communication device 414 as the checkpoint information.

Figure 11:
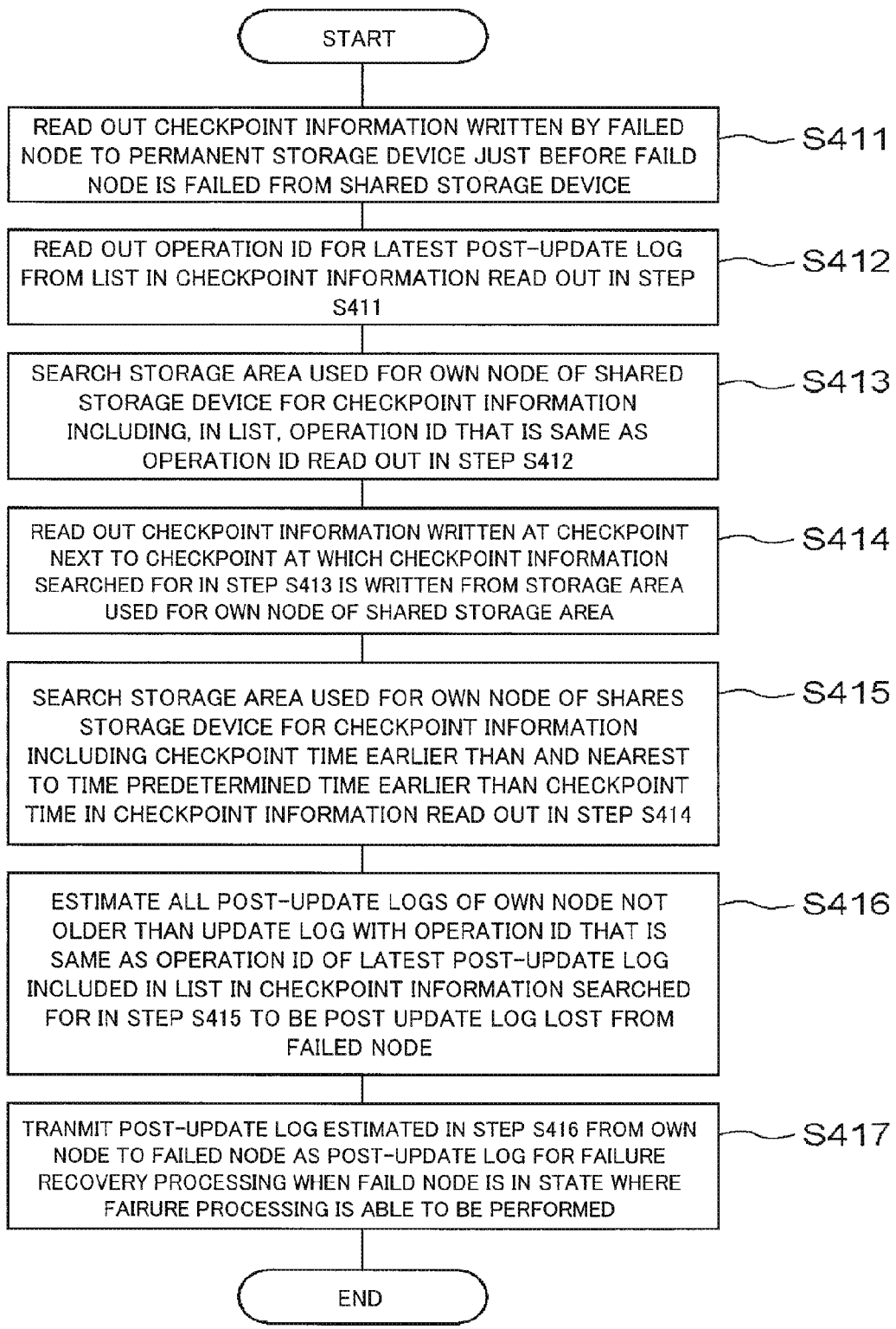
FIG. 11 is a flowchart showing an example of a process performed by an other-node-failure recovery unit according to the fourth exemplary embodiment of the present invention.

FIG. 11 is a flowchart showing an example of the processing performed by the other-node-failure recovery unit. An operation of the other-node-failure recovery unit 4214 in the processing device 421 of the node 420 will be described below with reference to FIG. 11. The operation of the other-node-failure recovery unit 4114 of the node 410 is the same as that of the other-node-failure recovery unit 4214 of the node 420.

When detecting the node 410 being failed by the notification by an operator, suspension of a heartbeat signal periodically received from the node 410, or the like, the other-node-failure recovery unit 4214 starts the processing shown in FIG. 11. First, the other-node-failure recovery unit 4214 accesses the storage area 441 for the node 410 of the shared storage device 440 via the network 450 through the communication device 424, and reads out the last checkpoint information written by the node 410 to the update history storage unit 4121 just before the node 410 is failed (Step S411).

Next, the other-node-failure recovery unit 4214 reads out the operation ID of the latest post-update log from the list in the checkpoint information which is read out (Step S412). Next, the other-node-failure recovery unit 4214 searches the storage area 442, which is for the own node 420, of the shared storage device 440 for the checkpoint information including a list including the operation ID that is the same as the operation ID read out in step S412 (Step S413). Next, the other-node-failure recovery unit 4214 reads out, from the storage area 442 for the node 420 of the shared storage device 440, the checkpoint information written at a checkpoint next to the checkpoint at which the checkpoint information searched for in Step S413 is written (Step S414). Next, the other-node-failure recovery unit 4214 searches the storage area 442, which is for the node 420, of the shared storage device 440 for the checkpoint information including a checkpoint time that is earlier than and nearest to a time a predetermined time earlier than the checkpoint time in the checkpoint information read out in step S414 (Step S415). Here, the above-mentioned predetermined time is equal to 2T i.e. the double of T which is described below. Next, the other-node-failure recovery unit 4214 estimates all the post-update logs, of the own node 420, not older than the post-update log with the operation ID that is the same as the operation ID of the latest post-update log that is included in the list in the checkpoint information searched for in step S415 to be the post-update log that is lost from the failed node 410 (Step S416).

Next, when detecting the node 410 which is failed being in a state where a failure recovery operation is able to be performed by a notification by an operator, receiving a heartbeat signal from the node 410, or the like, the other-node-failure recovery unit 4214 reads out the post-update log estimated in step S416 from the temporary storage device 423 or the update history storage unit 4221, and transmits the post-update log which is read out to the node 410 through the communication device 424 via the network 450 (S417).

The operation of the other-node-failure recovery unit 4214 will be described more specifically.

Here, it is assumed that T is the maximum value of a time period between a time at which the data operation requesting devices 430-1 and 430-2 transmit the data operation request to one of the nodes 410 and 420 and a time at which the data operation requesting devices 430-1 and 430-2 transmit the same data operation request to the other. For example, when data operation requesting devices 430-1 and 430-2 replicate the data operation request and transmit the data operation request in a certain timeout time period, T is equal to the timeout time period. In the worst case, the update logs having possibility of being lost from the failed node are the post-update logs not older than the post-update log received at a time 2T earlier than the time at which the normal node receives the post-update log that is the same as the last post-update log written to the permanent storage device by the failed node. This will be described with reference to FIG. 12.

Figure 12:
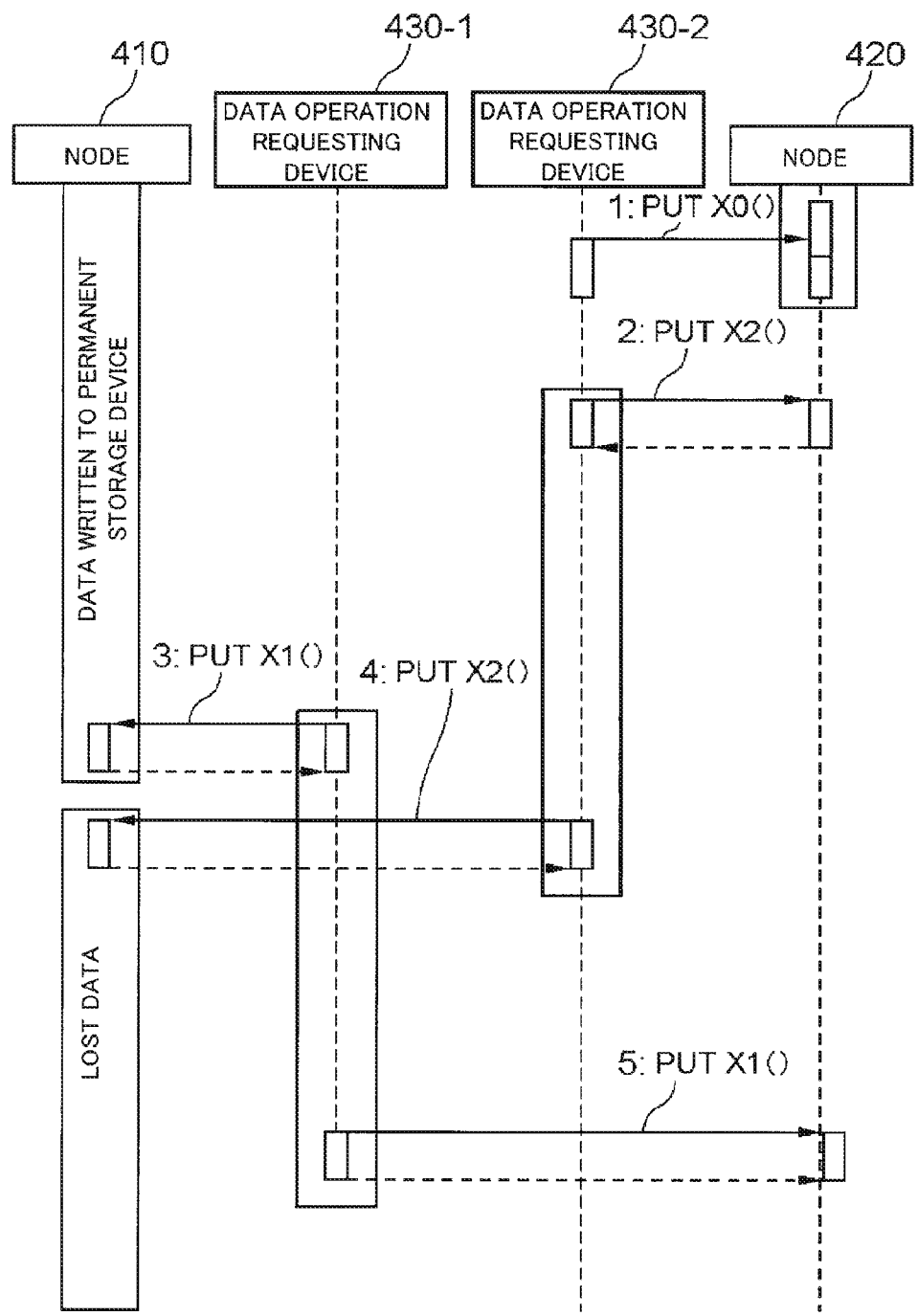
FIG. 12 is a figure illustrating a post-update log having possibility of being lost from a failed node in the fourth exemplary embodiment of the present invention.

FIG. 12 is a sequence chart showing an example of a state where the data operation requesting devices 430-1 and 430-2 transmit the same data operation request to the nodes 410 and 420. In the example shown in FIG. 12, the data operation requesting device 430-1 transmits a data operation request PUTX1( ) to the node 410 first, and then transmits the same data operation request PUTX1( ) to the node 420 before the timeout occurs. In contrast to this, the data operation requesting device 430-2 transmits a data operation request PUTX2( ) to the node 420 first, and then transmits the same data operation request PUTX2( ) to the node 410 before the timeout occurs. Just after the node 410 receiving the data operation request PUTX1( ), the node 410 performs the checkpoint processing, and just after performing the checkpoint processing, the node 410 is failed. The data operation requesting device 430-2 transmits the data operation request PUTX2( ) to the node 410 just after the node 410 is failed. In such worst situation, there is a possibility that the data operation request not older than the data operation request PUTX2( ) received at a time 2T earlier than the time at which the node 420 receives the data operation request PUTX1( ) is lost from the node 410.

However, a time at which the node 420 receives the data operation request such as the data operation request PUTX1( ) or the data operation request PUTX2( ) is not recorded. A history of the past checkpoint times is recorded in the checkpoint information. The time of receiving the data operation request related with the post-update log recorded in the checkpoint information of a checkpoint time t1 is not earlier than a checkpoint time t0 recorded in the checkpoint information of the just previous checkpoint. Accordingly, the times of receiving the data operation requests PUTX1( ) and PUTX2( ) are approximated as the checkpoint time of the checkpoint just previous to the checkpoint at which the post-update logs of the data operation requests are written into the checkpoint information. As a result, the post-update logs not older than the post-update log received at a time 2T earlier than the time of receiving, by the normal node, the post-update log corresponding to the last post-update log written by the failed node at the checkpoint time is able to be obtained by the procedure shown in FIG. 11.

Next, operations of the failure recovery units 4113 and 4213 will be described. The operations of the failure recovery units 4113 and 4213 is basically the same as the operations of the failure recovery units 3113 and 3213 according to the third exemplary embodiment. However, because a post-update log for failure recovery, which is transmitted from another node, may be data of obsolete version information, the failure recovery units 4113 and 4213 operate so as not to overwrite data with the post-update log of obsolete version information.

Thus, according to the present exemplary embodiment, under a situation where time series of the post-update logs may differ between the nodes 410 and 420, by identifying, with allowance of a proper margin, the post-update log lost from the failed node with an extra, it is possible to prevent unrecovered data due to extraction of not all the post-update logs lost from the failed node, and it is possible to prevent useless increase of the post-update logs for failure recovery.

[Fifth Exemplary Embodiment]

Figure 13:
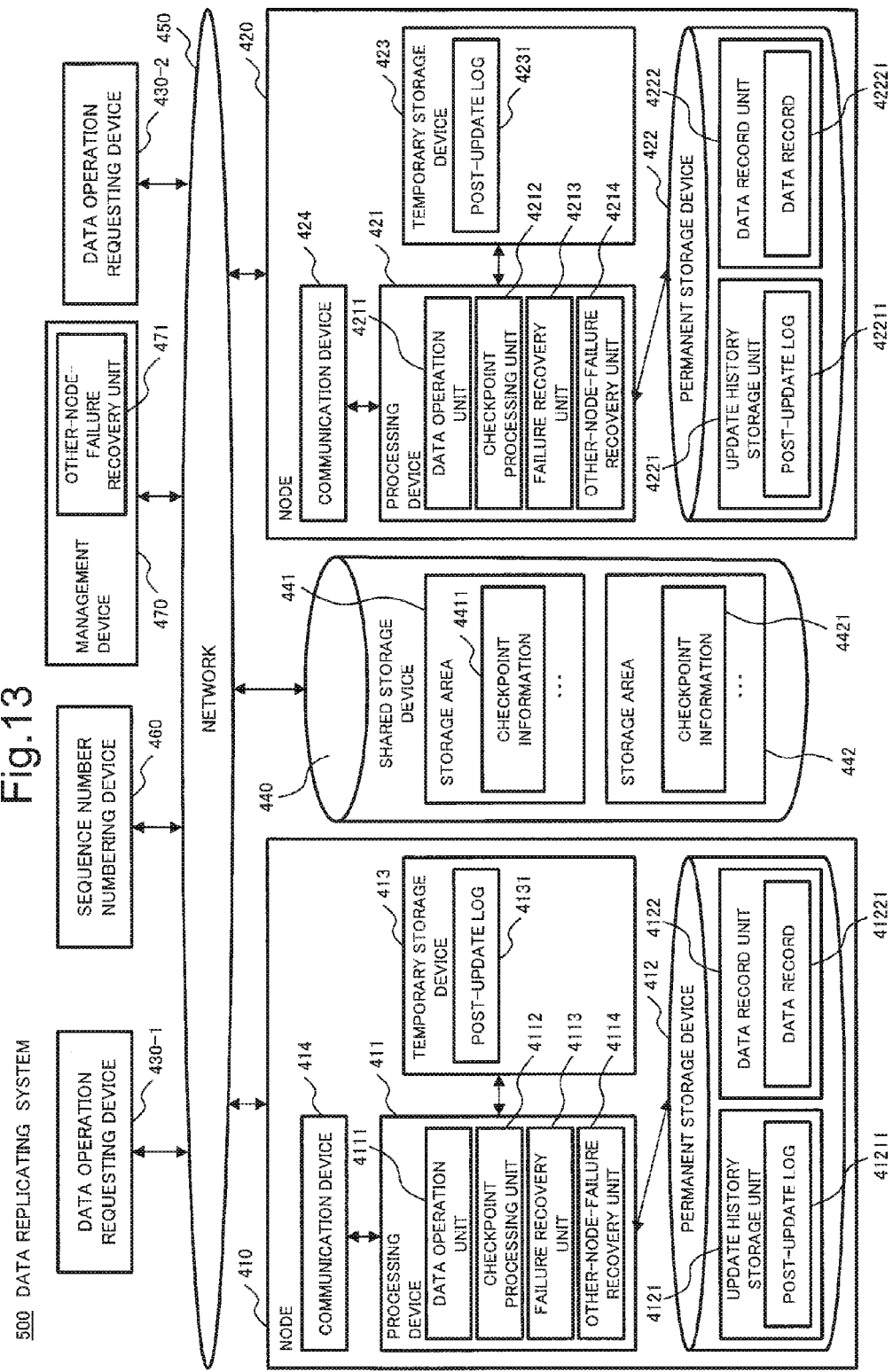
FIG. 13 is a block diagram of a data replicating system according to a fifth exemplary embodiment of the present invention.

In the first to fourth exemplary embodiments described above, each of the nodes has a function of estimating the post-update log lost from the failed node and a function of obtaining the estimated post-update log from the normal node and transmit the obtained post-update log to the failed node. However, a management device other than the node may have these functions. FIG. 13 shows a block diagram of such a data replicating system 500 according to the present exemplary embodiment.

The data replicating system 500 shown in FIG. 13 is different from the data replicating system 400 shown in FIG. 9 according to the fourth exemplary embodiment in a point where a management device 470 is connected with the network 450. The management device 470 includes an other-node-failure recovery unit 471.

When the failed node is the node 410, for example, the other-node-failure recovery unit 471 reads out the checkpoint information written by the node 410 from the shared storage device 440 first. Next, the other-node-failure recovery unit 471 estimates the post-update log having probability of being lost from the temporary storage device 413 of the node 410 which is failed on the basis of the checkpoint information which is read out. The other-node-failure recovery unit 471 estimates the post-update log a method that is the same as the method used by the other-node-failure recovery unit 4214 of the node 420 according to the fourth exemplary embodiment. The other-node-failure recovery unit 471 reads out the estimated post-update log from the update history storage unit 4221 or the temporary storage device 423 of the node 420 through, for example, the data operation unit 4211 of the node 420, and transmits the post-update log as the post-update log for failure recovery to the node 410 in which is failed.

In the present exemplary embodiment, the management device 470 is added to the fourth exemplary embodiment. It is also possible to add a management device similar to the management device 470 to the second exemplary embodiment or the third exemplary embodiment.

[Another Exemplary Embodiment]

The present invention has been described above with reference to the exemplary embodiments, but is not limited to the exemplary embodiments described above. Various additional changes may be made. For example, the following exemplary embodiments are also included in the present invention.

Though the fourth exemplary embodiment is exemplified as a situation where time series of the post-update logs of a plurality of nodes includes reversal, the present invention is not limited to such an example like the situation. For example, the present invention is applicable to a data replicating system includes data operation requesting devices replicate the data operation request without assigning a sequence number to the data operation request and transmit the data operation request to nodes, and each of the nodes processes the data operation request in order of receiving. In the data replicating system like that, when the time series of the post-update logs of the nodes include reversal, data inconsistency of data in the nodes may occur, and a data operation request may not be processed. However, such a state is able to be detected and the state is able to be recovered to a normal state. Accordingly, when extracting the post-update log lost from the failed node from the node that is recovered to the normal state, it is possible to use a method similar to the method described in the fourth exemplary embodiment of the present invention.

In the second to fourth exemplary embodiments, the number of the nodes is two. Therefore, when one of the two nodes is failed, the number of the nodes which is not failed is one. Therefore, in the second to fourth exemplary embodiments, the other-node-failure recovery unit of the node which is not failed extracts the post-update log for failure recovery processing from the own node. However, when the number of nodes is three or more, the other-node-failure recovery unit of the node which is not failed may extract the post-update log for the failure recovery processing from another node which is not failed and transmit the post-update log which is extracted to the node which is failed.

This application based upon and claims the benefit of priority from Japanese Patent Application No. 2013-050236, filed on Mar. 13, 2013, the disclosure of which is hereby incorporated by reference in its entirety.

INDUSTRIAL APPLICABILITY

The present invention can be used for a data replicating system such as a distributed KVS which replicates KV data.

REFERENCE SIGNS LIST 100, 200, 300, 400, and 500 data replicating system
110, 210, 310, and 410 node
111, 211, 311, and 411 processing device
1111, 2111, 3111, and 4111 data operation unit
1112, 2112, 3112, and 4112 checkpoint processing unit
2113, 3113, and 4113 failure recovery unit
2114, 3114, and 4114 other-node-failure recovery unit
112, 212, 312, and 412 permanent storage device
1121, 2121, 3121, and 4121 update history storage unit
11211, 21211, 31211, and 41211 post-update log
1122, 2122, 3122, and 4122 data record unit
11221, 21221, 31221, and 41221 data record
113, 213, 313, and 413 temporary storage device
1131, 2131, 3131, and 4131 post-update log
114, 214, 314, and 414 communication device
120, 220, 320, and 420 node
121, 221, 321, and 421 processing device
1211, 2211, 3211, and 4211 data operation unit
1212, 2212, 3212, and 4212 checkpoint processing unit
2213, 3213, and 4213 failure recovery unit
2214, 3214, and 4214 other-node-failure recovery unit
122, 222, 322, and 422 permanent storage device
1221, 2221, 3221, and 4221 update history storage unit
12211, 22211, 32211, and 42211 post-update log
1222, 2222, 3222, and 4222 data record unit
12221, 22221, 32221, and 42221 data record
123, 223, 323, and 423 temporary storage device
1231, 2231, 3231, and 4231 post-update log
124, 224, 324, and 424 communication device
130, 230, 330-1, 330-2, 430-1, and 430-2 data operation requesting device
140, 240, 340, and 440 shared storage device
141, 241, 341, and 441 storage area
1411, 2411, 3411, and 4411 checkpoint information
142, 242, 342, and 442 storage area
1421, 2421, 3421, and 4421 checkpoint information
150, 250, 350, and 450 network
360 and 460 sequence number numbering device
470 management device
471 other-node-failure recovery unit

The invention claimed is:

1. A data replicating system including a plurality of nodes, the plurality of nodes receiving a data operation request from a data operation requesting device which replicates a data operation request and transmits the same data operation requests to the plurality of nodes, the data replicating system comprising:
a shared storage device that is accessible from the plurality of nodes, wherein
each of the nodes includes: a processing device; a permanent storage device; and a temporary storage device,
the permanent storage device includes: first memory that stores a data record; and second memory that stores a post-update log of the data record, and
the processing device includes:
a transmitter that transmits a response to the data operation requesting device when writing, to the temporary storage device of an own node, the post-update log of the data record on executing an operation requested by the data operation request; and
a processor that, when a checkpoint time comes, updates the first memory of the own node on a basis of the post-update log of the data record stored in the temporary storage device of the own node, writes the post-update log of the data record stored in the temporary storage device of the own node to the second memory of the own node, and writes, to the shared storage device, checkpoint information including information identifying a latest post-update log written to the second memory;
wherein:
the processing device of each of the nodes includes:
a reader that reads out, from the shared storage device, the checkpoint information written by a node which is failed, estimates the post-update log having possibility of being lost from the temporary storage device of the node which is failed on a basis of the checkpoint information which is read out, reads out the post-update log that is same as the estimated post-update log from the second memory or the temporary storage device of the node other than the node which is failed, and transmits the post-update log which is read out as a post-update log for failure recovery to the node which is failed.

2. The data replicating system according to claim 1, wherein
the processing device of each node includes:
a receiver that receives the post-update log for failure recovery, and performing failure recovery processing of the own node by using the received post-update log for failure recovery.

3. The data replicating system according to claim 1, wherein
the data operation request includes an operation ID uniquely identifying the data operation request,
when writing the post-update log to the temporary storage device, the transmitter appends the operation ID included in the data operation request related with the post-update log to the post-update log, and write the appended operation ID to the temporary storage device, and
when writing the checkpoint information to the shared storage device, the processor writes, to the shared storage device, the checkpoint information with the operation ID appended to the latest post-update log.

4. The data replicating system according to claim 3, wherein
when estimating the post-update log having possibility of being lost, the reader reads out from the shared storage device the operation ID of the checkpoint information written by the node which is failed, and estimates the post-update log stored on or after a time of storing the post-update log with the operation ID that is same as the operation ID which is read out to be the post-update log having possibility of being lost.

5. The data replicating system according to claim 1, wherein
the data operation request includes the operation ID uniquely identifying the data operation request,
when writing the post-update log to the temporary storage device, the transmitter appends the operation ID included in the data operation request related with the post-update log to the post-update log, and write the operation ID appended to the post-update log to the temporary storage device, and when writing the checkpoint information to the shared storage device, the processor writes, to the shared storage device, the checkpoint information including a list of the operation ID appended to the post-update log written to the second memory and a checkpoint time.

6. The data replicating system according to claim 5, wherein when estimating the post-update log having possibility of being lost, the reader reads out, from the shared storage device, the last checkpoint information written by the node which is failed, reads out the operation ID of the latest post-update log from the list of the post-update log in the checkpoint information which is read out, reads out, from the shared storage device, the checkpoint information, in the checkpoint information of a for-failure-recovery node, including the list including the operation ID that is same as the operation ID which is read out, the for-failure-recovery node being a node from which the post-update log for failure recovery is obtained, reads out the checkpoint information, written at a checkpoint immediately before a checkpoint at which the checkpoint information which is read out is written, of the for-failure-recovery node from the shared storage device, searches the shared storage device for the checkpoint information of the for-failure-recovery node whose checkpoint time is earlier than and nearest to a time made by a predetermined time added to the checkpoint time in the checkpoint information which is read out, and estimates the post-update log, not older than the latest post-update log in the list in the checkpoint information which is searched for, of the for-failure-recovery node to be the post-update log having possibility of being lost.

7. The data replicating system according to claim 6, wherein the predetermined time is a time made by doubling a time from transmitting the data operation request by the data operation requesting device to a first node in the plurality of nodes until transmitting the same data operation request to a last node in the plurality of nodes.

8. A data replicating system including a plurality of nodes, the plurality of nodes receiving a data operation request from a data operation requesting device which replicates a data operation request and transmits the same data operation requests to the plurality of nodes, the data replicating system comprising:

a shared storage device that is accessible from the plurality of nodes, wherein each of the nodes includes: a processing device; a permanent storage device; and a temporary storage device, the permanent storage device includes: first memory that stores a data record; and second memory that stores a post-update log of the data record, and the processing device includes:

a transmitter that transmits a response to the data operation requesting device when writing, to the temporary storage device of an own node, the post-update log of the data record on executing an operation requested by the data operation request; and a processor that, when a checkpoint time comes, updates the first memory of the own node on a basis of the post-update log of the data record stored in the temporary storage device of the own node, writes the post-update log of the data record stored in the temporary storage device of the own node to the second memory of the own node, and writes, to the shared storage device, checkpoint information including information identifying a latest post-update log written to the second memory a management device connected with the plurality of nodes and the shared storage device, wherein the management device includes:

a reader that reads out from the shared storage device the checkpoint information written by the node which is failed, estimates the post-update log having possibility of being lost from the temporary storage device of the node which is failed on a basis of the checkpoint information which is read out, reads out the post-update log that is same as the estimated post-update log from the second memory or the temporary storage device of the node other than the node which is failed, and transmits the post-update log which is read out as a post-update log for failure recovery to the node which is failed.

9. A data replicating method in a data replicating system including: a plurality of nodes and a temporary storage device, the plurality of nodes each including: a processing device; a permanent storage device; and a temporary storage device, a shared storage device being accessible from a plurality of the nodes, the plurality of nodes receiving a data operation request from a data operation requesting device which replicates the data operation request and transmits same data operation request to the plurality of nodes, the permanent storage device including: first memory that stores a data record; and second memory that stores a post-update log of the data record, the data replicating method comprising:

when writing, to the temporary storage device of an own node, the post-update log of the data record on executing an operation requested by the data operation request, by the processing device of each of the nodes, returning a response to the data operation requesting device, when a checkpoint time comes, by the processing device of each of the nodes, updating the first memory of the own node on a basis of the post-update log of the data record stored in the temporary storage device of the own node, writing, to the second memory of the own node, the post-update log of the data record stored in the temporary storage device of the own node, and writing, to the shared storage device, checkpoint information including information identifying a latest post-update log written to the second memory, and reading out from the shared storage device the checkpoint information written by a node which is failed, estimating the post-update log having possibility of being lost from the temporary storage device of the node which is failed on a basis of the checkpoint information which is read out, reading out the post-update log that is same as the estimated post-update log from the second memory or the temporary storage device of the node other than the node which is failed, and transmitting the post-update log which is read out as a post-update log for failure recovery to the node which is failed.

10. A node device connected with a data operation requesting device replicating a data operation request and transmitting the data operation request and a shared storage device shared with another node device, the node device comprising:

a processing device; a permanent storage device; and a temporary storage device, wherein the permanent storage device includes: first memory that stores a data record; and second memory that stores a post-update log of the data record, and the processing device includes:

a transmitter that transmits a response to the data operation requesting device when writing, to the temporary storage device of an own node, the post-update log of the data record on executing an operation requested by the data operation request; and a processor that, when a checkpoint time comes, updates the first memory of the own node on a basis of the post-update log of the data record stored in the temporary storage device of the own node , writes, to the second memory of the own node, the post-update log of the data record stored in the temporary storage device of the own node, and writes, to the shared storage device, checkpoint information including information identifying a latest post-update log written to the second memory, wherein:

the processing device of each of the nodes includes:

a reader that reads, from the shared storage device, the checkpoint information written by a node which is failed, estimates the post-update log having probability of being lost from the temporary storage device of the node which is failed on a basis of the checkpoint information which is read out, reads out the post-update log that is same as the estimated post-update log from the second memory or the temporary storage device of the node other than the node which is failed, and transmits the post-update log which is read out as a post-update log for failure recovery to the node which is failed.

11. The node device according to claim 10, wherein the processing device includes:

a receiver that receives the post-update log for failure recovery, and performs a failure recovery processing of the own node by using the received post-update log for failure recovery.

12. The node device according to claim 10, wherein the data operation request includes an operation ID uniquely identifying the data operation request, when writing the post-update log to the temporary storage device, the transmitter appends the operation ID included in the data operation request related with the post-update log to the post-update log, and write the appended operation ID to the temporary storage device, and when writing the checkpoint information to the shared storage device, the processor writes, to the shared storage device, the checkpoint information with the operation ID appended to the latest post-update log.

13. The node device according to claim 12, wherein when estimating the post-update log having probability of being lost, the reader reads out the operation ID of the checkpoint information written by the node which is failed from the shared storage device, and estimates the post-update log not older than the post-update log with the operation ID that is same as the operation ID which is read out to be the post-update log having probability of being lost.

14. The node device according to claim 10, wherein the data operation request includes the operation ID uniquely identifying the data operation request, when writing the post-update log to the temporary storage device, the transmitter appends the operation ID included in the data operation request related with the post-update log to the post-update log, and write the operation ID appended to the post-update log to the temporary storage device, and when writing the checkpoint information to the shared storage device, the processor writes, to the shared storage device, the checkpoint information including a list of the operation ID appended to the post-update log written to the second memory and a checkpoint time.

15. The node device according to claim 14, wherein when estimating the post-update log having probability of being lost, the reader reads out, from the shared storage device, the last checkpoint information written by the node which is failed , reads out the operation ID of the latest post-update log from the list of the post-update log in the checkpoint information which is read out, reads out, from the shared storage device, the checkpoint information, in the checkpoint information of a for-failure-recovery node, including the list including the operation ID that is same as the operation ID which is read out, the for-failure-recovery node being a node from which the post-update log for failure recovery is obtained, reads out the checkpoint information, written at a checkpoint immediately before the checkpoint at which the checkpoint information which is read out is written, of the for-failure-recovery node from the shared storage device, searches the shared storage device for the checkpoint information of the for-failure-recovery node whose the checkpoint time is earlier than and nearest to a time made by a predetermined time added to the checkpoint time in the checkpoint information which is read out, and estimates the post-update log, not older than the latest post-update log in the list in the checkpoint information which is searched for, of the for-failure-recovery node to be the post-update log having probability of being lost.

16. The node device according to claim 15, wherein the predetermined time is a time made by doubling the time from transmitting the data operation request by the data operation requesting device to a first node in the plurality of nodes until transmitting the same data operation request to a last node in the plurality of nodes.

17. A management device in a data replicating system including: a shared storage device including a plurality of nodes; and a shared storage device accessible from the plurality of nodes, the management device connected to the plurality of nodes and the shared storage device, the management device comprising:

a reader that reads out, from the shared storage device, checkpoint information written by a node which is failed, the node being in the plurality of nodes each including: a processing device; a permanent storage device; and a temporary storage device, the plurality of nodes each receiving a data operation request from a data operation requesting device replicating the data operation request and transmitting the same data operation request to the plurality of nodes, the permanent storage device including: first memory that stores a data record; and second memory that stores a post-update log of the data record, the processing device including:

a transmitter that transmits a response to the data operation requesting device when writing the post-update log of the data record on execution of the operation requested by the data operation request to the temporary storage device of a own node; and a processor that, when a checkpoint time comes, updates the first memory of the own node on a basis of the post-update log of the data record stored in the temporary storage device of the own node , writes the post-update log of the data record stored in the temporary storage device of the own node to the second memory of the own node, and writes the checkpoint information, the checkpoint information including information identifying a latest post-update log written to the second memory in the shared storage device, estimates the post-update log having possibility of being lost from the temporary storage device of the node which is failed on a basis of the checkpoint information which is read out, reads out the post-update log that is same as the estimated post-update log from the second memory or the temporary storage device of the node other than the node which is failed, and transmits the post-update log which is read out as a post-update log for failure recovery to the node which is failed.

18. A non-transitory computer readable medium storing a program causing a computer with which a processing device of a node device is configured, the node device connected with a data operation requesting device replicating a data operation request and transmitting the data operation request and a shared storage device shared with another node device, the node device including: the processing device; a permanent storage device; and a temporary storage device, the permanent storage device including: first memory storing a data record; and an second memory storing a post-update log of the data record, to function as:

a transmitter that transmits a response to the data operation requesting device when writing, to the temporary storage device of an own node, the post-update log of the data record on executing the operation requested by the data operation request; and a processor that, when a checkpoint time comes, updates the first memory of the own node on a basis of the post-update log of the data record stored in the temporary storage device of the own node, writes, to the second memory of the own node, the post-update log of the data record stored in the temporary storage device of the own node , and writes, to the shared storage device, checkpoint information including information identifying a latest post-update log written to the second memory;

wherein the processing device of each of the nodes includes:

a reader that reads, from the shared storage device, the checkpoint information written by a node which is failed, estimates the post-update log having probability of being lost from the temporary storage device of the node which is failed on a basis of the checkpoint information which is read out, reads out the post-update log that is same as the estimated post-update log from the second memory or the temporary storage device of the node other than the node which is failed, and transmits the post-update log which is read out as a post-update log for failure recovery to the node which is failed.

19. A non-transitory computer readable medium storing a program for a computer with which a management device is configured, the management device being in a data replicating system, the data replicating system includes: a plurality of nodes; and a shared storage device accessible from the plurality of nodes, the management device connected to the plurality of nodes and the shared storage device, the program causing the computer to function as:

reader that read out checkpoint information written by a node which is failed from the shared storage device, the node being in the plurality of nodes, the plurality of nodes each including: a processing device; a permanent storage device; and a temporary storage device, the nodes each receiving a data operation request from a data operation requesting device replicating the data operation request and transmitting the same data operation requests to the plurality of nodes, the permanent storage device including: first memory storing a data record; and second memory storing a post-update log of the data record, the processing device including: a transmitter that transmits a response to the data operation requesting device when writing the post-update log of the data record on execution of the operation requested by the data operation request to the temporary storage device of an own node; and a processor that, when a checkpoint time comes, updates the first memory of the own node on a basis of the post-update log of the data record stored in the temporary storage device of the own node, writes, to the second memory of the own node, the post-update log of the data record stored in the temporary storage device of the own node , and writes, to the shared storage device, checkpoint information including information identifying a latest post-update log written to the second memory, estimates the post-update log having possibility of being lost from the temporary storage device of the node which is failed on a basis of the checkpoint information which is read out, reads out the post-update log that is same as the estimated post-update log from the second memory or the temporary storage device of a node other than the node which is failed, and transmits the post-update log which is read out as a post-update log for failure recovery to the node which is failed as a post-update log for failure recovery.

* * * * *